US008669673B2

(12) United States Patent
Yamashita

(10) Patent No.: US 8,669,673 B2
(45) Date of Patent: Mar. 11, 2014

(54) POWER SUPPLY CONTROLLER

(75) Inventor: Masaharu Yamashita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 202 days.

(21) Appl. No.: 12/676,547

(22) PCT Filed: Nov. 10, 2008

(86) PCT No.: PCT/JP2008/070828
§ 371 (c)(1),
(2), (4) Date: Mar. 4, 2010

(87) PCT Pub. No.: WO2009/069484
PCT Pub. Date: Jun. 4, 2009

(65) Prior Publication Data
US 2010/0253140 A1    Oct. 7, 2010

(30) Foreign Application Priority Data
Nov. 28, 2007  (JP) ................................. 2007-307695

(51) Int. Cl.
*B60L 1/00*          (2006.01)
(52) U.S. Cl.
USPC ............ 307/9.1; 307/10.1; 318/376; 180/404
(58) Field of Classification Search
USPC .............. 307/9.1, 10.1, 31; 318/376; 180/404
See application file for complete search history.

(56) References Cited

U.S. PATENT DOCUMENTS 5,780,980 A * 7/1998 Naito ............................ 318/139
7,285,938 B2 * 10/2007 Aoyama ........................ 322/28
(Continued)

FOREIGN PATENT DOCUMENTS

JP      63 242772        10/1988
JP      8-196006 A       7/1996
(Continued)

OTHER PUBLICATIONS

Extended European Search Report issued May 4, 2012 in Patent Application No. 08853673.5

*Primary Examiner* — Jared Fureman
*Assistant Examiner* — Alfonso Perez Borroto
(74) *Attorney, Agent, or Firm* — Oblon, Spivak, McClelland, Maier & Neustadt, L.L.P.

(57) ABSTRACT

A power supply control section calculates a target charge/discharge current of a secondary power supply apparatus based on an actual charged amount and a target charged amount of the secondary power supply apparatus, and feedback-controls the stepped-up voltage of a step-up circuit such that an actual charge/discharge current detected by a secondary current sensor coincides with a target charge/discharge current. When the actual charged amount (1) is equal to or greater than the target charged amount, the target charge/discharge current is set to zero to prevent overcharging, and (2) is less than the target charged amount, a target charge current corresponding to a capacity margin of the step-up circuit is set to quickly charge the secondary power supply apparatus. When the output of the step-up circuit has no margin, the target charge/discharge current is set to zero.

17 Claims, 11 Drawing Sheets

(56) References Cited

U.S. PATENT DOCUMENTS

| | | | |
|---|---|---|---|
| 2002/0158606 A1* | 10/2002 | King | 320/125 |
| 2004/0145338 A1* | 7/2004 | Nakamura et al. | 318/801 |
| 2004/0222035 A1 | 11/2004 | Yoneda et al. | |
| 2005/0003925 A1* | 1/2005 | Wakashiro et al. | 477/2 |
| 2005/0257986 A1* | 11/2005 | Kagei | 180/404 |
| 2005/0269150 A1* | 12/2005 | Fujimoto et al. | 180/446 |
| 2006/0097577 A1 | 5/2006 | Kato et al. | |
| 2007/0104468 A1* | 5/2007 | Ueno et al. | 388/815 |
| 2007/0200521 A1* | 8/2007 | Ochiai et al. | 318/376 |
| 2008/0143183 A1* | 6/2008 | Hoshiba | 307/31 |
| 2008/0234897 A1* | 9/2008 | Tsuchida | 701/42 |
| 2009/0027933 A1* | 1/2009 | Kajouke et al. | 363/97 |

FOREIGN PATENT DOCUMENTS

| | | |
|---|---|---|
| JP | 11 341601 | 12/1999 |
| JP | 2001 339872 | 12/2001 |
| JP | 2004-56937 A | 2/2004 |
| JP | 2004 328988 | 11/2004 |
| JP | 2005-224011 A | 8/2005 |
| JP | 2005 287222 | 10/2005 |
| JP | 2006 217743 | 8/2006 |
| JP | 2006-273061 A | 10/2006 |
| JP | 2006 282121 | 10/2006 |
| JP | 2007 91122 | 4/2007 |

* cited by examiner

FIG.8
(A)
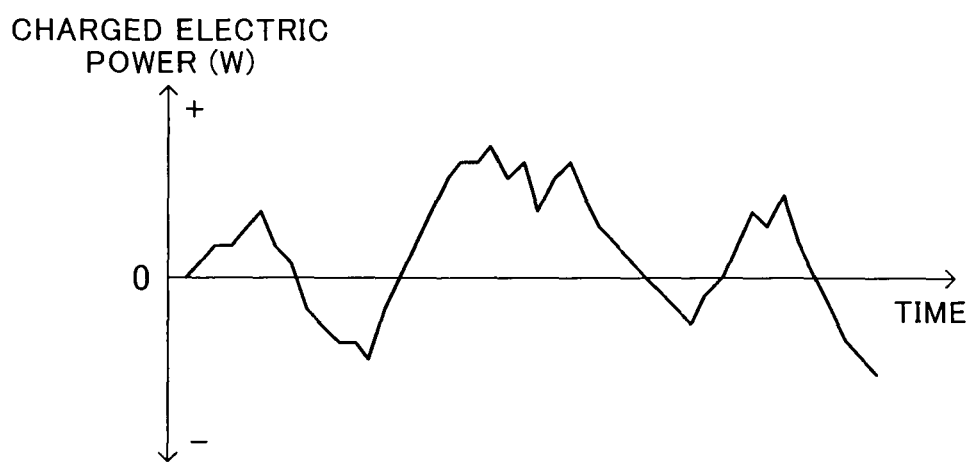
(B)
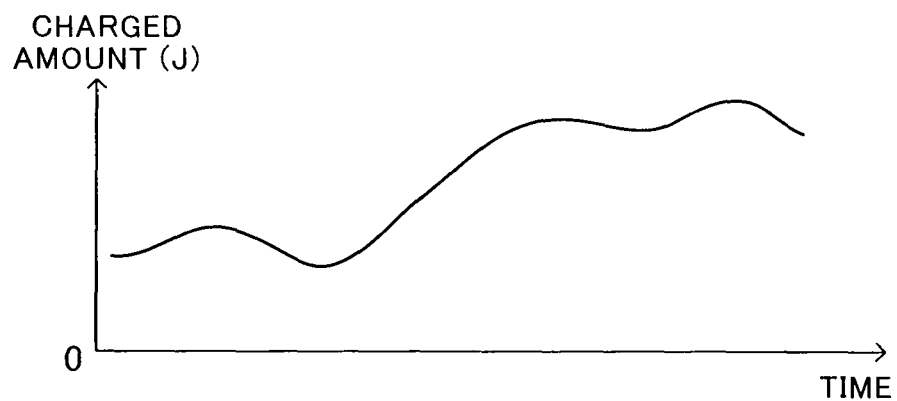

POWER SUPPLY CONTROLLER

TECHNICAL FIELD

The present invention relates to a power supply control apparatus which includes a primary power supply apparatus and a secondary power supply apparatus for supplying electric power to an electric actuator.

BACKGROUND ART

Conventionally, for example, an electric power steering apparatus includes an electric motor for imparting a steering assist torque to a rotating operation of a steering wheel, and adjusts the steering assist torque through performance of energization control which changes the current supplied to the electric motor. Such an electric power steering apparatus, which uses an onboard battery as a power source, consumes a large mount of electric power. Therefore, an apparatus proposed in Japanese Patent Application Laid-Open (kokai) No. 2007-91122 includes a secondary power supply apparatus for supplementing the onboard battery. The secondary power supply apparatus is connected in parallel with a power supply line extending from the onboard battery (hereinafter referred to as the "primary power supply apparatus") to a motor drive circuit. The secondary power supply apparatus is charged by the primary power supply apparatus, and supplies the charged electric power to the motor drive circuit. Further, the proposed apparatus includes a switch for starting and stopping the supply of electricity from the secondary power supply apparatus to the motor drive circuit, and a switch for starting and stopping the charging of electricity from the primary power supply apparatus to the secondary power supply apparatus.

DISCLOSURE OF THE INVENTION

Although the apparatus proposed in Japanese Patent Application Laid-Open No. 2007-91122 is configured to selectively perform the charging of electricity from the primary power supply apparatus to the secondary power supply apparatus or the supply of electricity from the secondary power supply apparatus to the motor drive circuit through operation of the switches, the apparatus cannot control the charging/discharging of the secondary power supply apparatus in a satisfactory manner. That is, since the charge/discharge line of the secondary power supply apparatus is connected to the power supply line extending from the primary power supply apparatus to the motor drive circuit, whether the secondary power supply apparatus is charged or discharged is determined by the voltage balance between the primary power supply apparatus and the secondary power supply apparatus. Therefore, even when the secondary power supply apparatus must be charged, the secondary power supply apparatus cannot be charged if a voltage difference does not arise between the power supply voltage of the primary power supply apparatus and that of the secondary power supply apparatus. This holds true in the case where electricity is supplied from the secondary power supply apparatus to the motor drive circuit. As a result, the secondary power supply apparatus cannot be maintained in a satisfactorily charged state.

The present invention has been accomplished so as to solve the above-described problem, and its object is to maintain the secondary power supply apparatus in a satisfactorily charged state.

In order to achieve the above-described object, the present invention provides a power supply control apparatus which includes a primary power supply apparatus; a step-up circuit which steps up an output voltage of the primary power supply apparatus and outputs the stepped up voltage to a drive circuit for an electric actuator; and a secondary power supply apparatus which is connected in parallel to a line between the step-up circuit and the drive circuit, into which electric power output from the step-up circuit is charged, and which supplements the supply of electric power to the drive circuit while using the charged electric power, the power supply control apparatus being characterized by comprising charged amount detection means for detecting an amount of electricity charged into the secondary power supply apparatus; and charge/discharge control means for controlling charging and discharging of the secondary power supply apparatus by controlling the stepped-up voltage of the step-up circuit on the basis of the detected charged amount and a target charged amount.

According to this invention, the output voltage of the primary power supply apparatus is stepped up by the step-up circuit, and the stepped-up voltage is supplied to the drive circuit for the electric actuator. The secondary power supply apparatus is connected in parallel to an electric power supply circuit extending from the step-up circuit to the drive circuit. Accordingly, the secondary power supply apparatus is charged with electric power output from the step-up circuit, and supplies the charged electric power to the drive circuit to thereby supplement the power supply of the primary power supply apparatus.

Either the stepped-up voltage of the step-up circuit or the power supply voltage (output voltage) of the secondary power supply apparatus is automatically selected to be supplied to the drive circuit in accordance with the balance between the stepped-up voltage and the power supply voltage (the relation of the magnitudes of the voltages). Therefore, in the present invention, the charge/discharge control means controls the charging/discharging of the secondary power supply apparatus by controlling the stepped-up voltage of the step-up circuit. In this case, the charge/discharge control means controls the stepped-up voltage of the step-up circuit on the basis of the charged amount of the secondary power supply apparatus detected by the charged amount detection means and the target charged amount. Accordingly, the charging and discharging of the secondary power supply apparatus can be properly switched, whereby a good charged state of the secondary power supply apparatus can be maintained. Notably, the target charged amount may be a previously determined fixed value or a value which is changed in accordance with the conditions of use, etc.

Further, according to the present invention, the voltage of the primary power supply apparatus is supplied to the drive circuit after being stepped up by the step-up circuit. Therefore, the electric actuator can be driven efficiently. In addition, since the charging/discharging of the secondary power supply apparatus can be controlled by making use of the step-up circuit, a large-scale addition of configurational components and a considerable increase in cost can be avoided.

Another feature of the present invention resides in that, when the detected charged amount is less than the target charged amount, the charge/discharge control means controls the stepped-up voltage such that the stepped-up voltage becomes higher than the power supply voltage of the secondary power supply apparatus.

According to this invention, when the charged amount, which is the amount of electricity charged in the secondary power supply apparatus, is less than the target charged amount, the stepped-up voltage is controlled such that the stepped-up voltage of the step-up circuit becomes higher than the power supply voltage of the secondary power supply apparatus. As a result, electric power of the primary power supply apparatus can be charged into the secondary power supply apparatus, whereby the charged amount of the secondary power supply apparatus can be supplemented.

Another feature of the present invention resides in that, when the detected charged amount is less than the target charged amount and a power consumption of the drive circuit is equal to or greater than an available electric power output of the step-up circuit (an electric power which the step-up circuit can output), the charge/discharge control means controls the stepped-up voltage such that the stepped-up voltage becomes equal to the power supply voltage of the secondary power supply apparatus.

According to this invention, even when the charged amount, which is the amount of electricity charged in the secondary power supply apparatus, is less than the target charged amount, if the power consumption of the drive circuit (electric power consumed to drive the electric actuator) is equal to or greater than the available electric power output of the step-up circuit, the stepped-up voltage is controlled such that the stepped-up voltage of the step-up circuit becomes equal to the power supply voltage of the secondary power supply apparatus. Accordingly, charging of electricity from the primary power supply apparatus to the secondary power supply apparatus is restricted, whereby electric power can be supplied to the drive circuit by use of both the primary power supply apparatus and the secondary power supply apparatus. That is, priority is given to the supply of electric power to the drive circuit over the charging of the secondary power supply apparatus. As a result, supplemental power supply from the secondary power supply apparatus to the drive circuit and suppression of electric power consumption (suppression of discharging) can be performed simultaneously.

Another feature of the present invention resides in that, when the detected charged amount is equal to or greater than the target charged amount, the charge/discharge control means controls the stepped-up voltage such that the stepped-up voltage becomes equal to the power supply voltage of the secondary power supply apparatus when electric power is supplied to the drive circuit.

According to the present invention, when the charged amount, which is the amount of electricity charged into the secondary power supply apparatus, is equal to or greater than the target charged amount, the step-up voltage is controlled such that the stepped-up voltage becomes equal to the power supply voltage of the secondary power supply apparatus when electric power is supplied to the drive circuit. Thus, charging of electricity from the primary power supply apparatus to the secondary power supply apparatus is restricted, whereby overcharging of the secondary power supply apparatus can be suppressed. Thus, the service life of the secondary power supply apparatus can be extended. Further, electric power can be properly supplied to the drive circuit by use of the primary power supply apparatus and the secondary power supply apparatus. Further, for example, when no electric power is supplied to the drive circuit, charging and discharging of the secondary power supply apparatus can be prevented by means of stopping the step-up operation of the step-up circuit. In this case, consumption of energy required for the step-up operation can be suppressed.

Another feature of the present invention resides in that the charge/discharge control means includes target-charge/discharge-current setting means for setting a target charge/discharge current of the secondary power supply apparatus on the basis of the charged amount detected by the charged amount detection means and the target charged amount; current detection means for detecting a charge/discharge current flowing to or from the secondary power supply apparatus; and feedback control means for feedback-controlling the stepped-up voltage of the step-up circuit on the basis of the difference between the target charge/discharge current set by the target-charge/discharge-current setting means and the charge/discharge current detected by the current detection means.

In this invention, the charge/discharge control means includes target-charge/discharge-current setting means, current detection means, and feedback control means. The target-charge/discharge-current setting means sets the target charge/discharge current of the secondary power supply apparatus on the basis of the charged amount detected by the charged amount detection means and the target charged amount. The current detection means detects the actual charge/discharge current flowing to or from the secondary power supply apparatus. The feedback control means feedback-controls the stepped-up voltage of the step-up circuit on the basis of the difference between the actual charge/discharge current flowing to or from the secondary power supply apparatus and the target charge/discharge current. That is, the step-up control is performed such that the difference between the actual charge/discharge current and the target charge/discharge current decreases. Notably, each of the target charge/discharge current set by the target-charge/discharge-current setting means and the charge/discharge current detected by the current detection means represents a current value determined to distinguish a charging direction and a discharging direction from each other; i.e., a current value with its flow direction specified.

For example, in the case where the detected charge current is greater than the target charge/discharge current in the charge direction, the feedback control means lowers the stepped-up voltage of the step-up circuit to thereby decrease the charge current flowing to the secondary power supply apparatus. Further, in the case where the target charge/discharge current is set to zero, the feedback control means operates differently depending on whether a charge current flows to the secondary power supply apparatus or a discharge current flows from the secondary power supply apparatus. That is, when a charge current flows to the secondary power supply apparatus, the feedback control means lowers the stepped-up voltage to thereby restrict the charging of electricity to the secondary power supply apparatus. When a discharge current flows from the secondary power supply apparatus, the feedback control means raises the stepped-up voltage to thereby restrict the discharging of electricity from the secondary power supply apparatus.

Therefore, according to the present invention, the charged state of the secondary power supply apparatus can be satisfactorily controlled to a target charged state, whereby overcharging or overdischarging of the secondary power supply apparatus can be suppressed.

Another feature of the present invention resides in that, when the charged amount detected by the charged amount detection means is less than the target charged amount, the target-charge/discharge-current setting means sets a target charge current on the basis of the available electric power output and the power consumption of the drive circuit.

According to this invention, when the charged amount of the secondary power supply apparatus has not yet reached the target charged amount, a target charge current (a target charge/discharge current in the charging direction) is set on the basis of the available electric power output of the step-up circuit and the power consumption of the drive circuit. Accordingly, the secondary power supply apparatus can be properly charged by use of electric power output from the step-up circuit. In this case, the feedback control mean raises the stepped-up voltage of the step-up circuit to a voltage higher than the power supply voltage of the secondary power supply apparatus such that the target charge current flows to the secondary power supply apparatus, whereby the secondary power supply apparatus is charged.

For example, preferably, the target charge current is set such that a differential electric power, which is obtained by subtracting the power consumption of the drive circuit from the available electric power output of the step-up circuit, is supplied to the secondary power supply apparatus. In this case, the secondary power supply apparatus can be charged by making full use of the margin of the output capacity of the step-up circuit. As a result, the secondary power supply apparatus can be charged quickly, and can stand by for a case where a large amount of electric power is consumed.

Another feature of the present invention resides in that, when the charged amount detected by the charged amount detection means is less than the target charged amount and the power consumption of the drive circuit becomes equal to or greater than the available electric power output of the step-up circuit, the target-charge/discharge-current setting means sets the target charge/discharge current to zero.

According to this invention, even in the case where the charged amount of the secondary power supply apparatus has not yet reached the target charged amount, when the power consumption of the drive circuit becomes equal to or greater than the available electric power output of the step-up circuit, the target charge/discharge current is set to zero. Accordingly, electric power of the primary power supply apparatus can be preferentially used for drive of the electric actuator. In this case, the stepped-up voltage of the step-up circuit is controlled to a voltage equal to the power supply voltage of the secondary power supply apparatus. However, when the power consumption of the drive circuit increases and the supply of electric power becomes insufficient, irrespective of the step-up control, the stepped-up voltage drops below the power supply voltage of the secondary power supply apparatus, so that electric power can be supplied from the secondary power supply apparatus to the drive circuit. That is, electric power can be supplied from the secondary power supply apparatus by an amount corresponding to the shortage of electric power of the primary power supply apparatus. As a result, supplemental power supply from the secondary power supply apparatus to the drive circuit and suppression of electric power consumption (suppression of discharging) of the secondary power supply apparatus can be performed simultaneously.

Another feature of the present invention resides in that, when the charged amount detected by the charged amount detection means is equal to or greater than the target charged amount, the target-charge/discharge-current setting means sets the target charge/discharge current to zero.

According to this invention, when the charged amount detected by the charged amount detection means is equal to or greater than the target charged amount, the target charge/discharge current is set to zero. Therefore, charge current does not flow to the secondary power supply apparatus, whereby overcharging of the secondary power supply apparatus can be suppressed. Accordingly, the service life of the secondary power supply apparatus can be extended. Further, the supply of electric power from the secondary power supply apparatus to the drive circuit is not performed when the power consumption of the driver circuit is less than the output capacity of the step-up circuit. Accordingly, the secondary power supply apparatus can be maintained in a satisfactorily charged state.

During a period in which electric power is supplied to the drive circuit, the stepped-up voltage of the step-up circuit is controlled to a voltage equal to the power supply voltage of the secondary power supply apparatus. However, when the power consumption of the drive circuit increases and the supply of electric power becomes insufficient, the stepped-up voltage drops irrespective of the step-up control. As a result, the power supply voltage of the secondary power supply apparatus becomes higher than the stepped-up voltage, so that electric power is supplied from the secondary power supply apparatus to the drive circuit. That is, electric power can be supplied from the secondary power supply apparatus to the drive circuit by an amount corresponding to the shortage of electric power of the primary power supply apparatus. As a result, supplemental power supply from the secondary power supply apparatus to the drive circuit and suppression of overcharging of the secondary power supply apparatus can be performed simultaneously.

Further, for example, when no electric power is supplied to the drive circuit, the charge/discharge current flowing to or from the secondary power supply apparatus can be made zero by means of stopping the step-up operation of the step-up circuit. In this case, consumption of energy required for the step-up operation can be suppressed.

Another feature of the present invention resides in that the charged amount detection means detects the charged amount of the secondary power supply apparatus on the basis of a cumulative value of the charge/discharge current flowing to or from the secondary power supply apparatus.

In this invention, the charged amount of the secondary power supply apparatus is detected by cumulating the charge/discharge current (measured values of charge current and discharge current) flowing to or from the secondary power supply apparatus. In this case, in a state where a charge current flows, the charge/discharge current is cumulated such that the charged amount of the secondary power supply apparatus increase; and, in a state where a discharge current flows, the charge/discharge current is cumulated such that the charged amount of the secondary power supply apparatus decreases. Accordingly, the amount of electricity held in the secondary power supply apparatus can be properly detected.

Another feature of the present invention resides in that a first target value is used as the target charged amount when the charged amount is determined to be less than the target charged amount, and a second target value greater than the first target value is used as the target charged amount when the charged amount is determined to be equal to or greater than the target charged amount.

In this invention, when the charged amount of the secondary power supply apparatus is compared with the target charged amount, the first target value and the second target value greater than the first target value are selectively used as the target charged amount. Therefore, when the charged amount of the secondary power supply apparatus assumes a value between the first target value and the second target value, the result of comparison does not reverse. For example, when the detected charged amount is equal to or greater than the first target value but less than the second target value, the latest result of comparison is maintained. Accordingly, a dead band is provided between the first target value and the second target value, whereby a hunting phenomenon in which charging and discharging of the secondary power supply apparatus are repeated frequently can be prevented. Thus, the service life of the secondary power supply apparatus can be extended.

Another feature of the present invention is provision of stepped-up-voltage detection means for detecting the stepped-up voltage of the step-up circuit; step-up-current detection means for detecting an output current of the step-up circuit; and upper-limit-voltage setting means for setting an upper limit of the stepped-up voltage controlled by the charge/discharge control means in accordance with the detected output current, such that the output electric power of the step-up circuit does not exceed an available electric power output of the step-up circuit.

In this invention, the stepped-up-voltage detection means detects the stepped-up voltage of the step-up circuit (stepped-up voltage value), and the step-up-current detection means detects the output current of the step-up circuit (output current value). The upper-limit-voltage setting means sets the upper limit of the stepped-up voltage on the basis of the detected output current such that the output electric power of the step-up circuit does not exceed the available electric power output of the step-up circuit. Accordingly, the step-up circuit can be protected, and a drop in voltage-stepping-up efficiency can be suppressed. Further, when the electric power required by the drive circuit exceeds the available electric power output of the step-up circuit, the stepped-up voltage drops due to the upper limit restriction. By virtue of this, the power supply voltage of the secondary power supply apparatus becomes higher than the stepped-up voltage, whereby it becomes possible to reliably supply electric power from the secondary power supply apparatus to the drive circuit.

Another feature of the present invention resides in that the upper-limit-voltage setting means sets a fixed upper limit voltage when the detected output current is equal to or less than a reference current, and sets an upper limit voltage which decreases with an increase in the detected output current when the output current exceeds the reference current.

According to this invention, since a fixed upper limit voltage is set when the detected output current is equal to or less than the reference current, protection of the step-up circuit and suppression of dropping of voltage-stepping-up efficiency can be realized. Further, since an upper limit voltage which decreases with an increase in the detected output current is set when the output current exceeds the reference current, protection of the step-up circuit and suppression of dropping of voltage-stepping-up efficiency can be realized. In addition, it becomes possible to reliably supply electric power from the secondary power supply apparatus to the drive circuit.

Further, for example, when the output current exceeds the reference current, preferably, an upper limit voltage which decreases inverse-proportionally to an increase in the detected output current is set. In this case, the output electric power of the step-up circuit can be restricted to a fixed upper limit electric power.

Another feature of the present invention resides in that the power supply control apparatus is used for a steering apparatus of a vehicle which imparts a steering force to wheels by operating the electric actuator.

In this invention, the power supply control apparatus is applied to a power supply control apparatus of a steering apparatus including an electric actuator which imparts a steering force to wheels. The steering apparatus may be an electronic power steering apparatus which assists a driver's steering operation through operation of an electric actuator. In such a steering apparatus, the power consumption of the electric actuator is large, and the required electric power changes greatly in accordance with the state of steering operation and the traveling state of the vehicle.

Accordingly, through application of the present invention to a power supply control apparatus of a steering apparatus of a vehicle, electric power can be supplied by making proper use of the secondary power supply apparatus when a large amount of electric power is needed. Thus, occurrence of a problematic phenomenon in which a proper steering force cannot be obtained due to shortage of electric power can be suppressed. Further, when a large amount of electric power is needed, the supply of electric power is supplemented by use of the secondary power supply apparatus. Therefore, an increase in the capacity of the primary power supply apparatus can be suppressed.

Another feature of the present invention resides in that the electric actuator is an electric motor; and the drive circuit is a bridge circuit for driving the electric motor while adjusting the voltage of the supplied electric power through duty control of switching elements.

In the steering apparatus to which the present invention is applied, the electric motor is controlled by use of a bridge circuit, whereby a steering force is imparted to wheels. The bridge circuit receives electric power from the step-up circuit or the secondary power supply apparatus and outputs the electric power to the electric motor while adjusting its voltage by means of duty control. Accordingly, even when the power supply voltage supplied to the bridge circuit changes due to the step-up control, the electric motor can be properly driven and controlled through voltage adjustment performed by the bridge circuit. Further, since the electric motor is driven by use of electric power whose voltage has been stepped up by the step-up circuit, the drive efficiency can be improved. Notably, a three-phase inverter circuit, an H bridge circuit, or the like can be used as the bridge circuit.

Another feature of the present invention is provision of vehicle-speed-information obtaining means for obtaining vehicle speed information; and target-charged-amount setting means for setting the target charged amount on the basis of the obtained vehicle speed information.

In a steering apparatus of a vehicle to which the present invention is applied, a steering force is imparted to wheels by use of an electric actuator. In this case, the amount of electric power required to impart a steering force to the wheels changes in accordance with the vehicle speed. That is, the lower the vehicle speed, the greater the amount of electric power required to be supplied to the electric actuator, and the higher the vehicle speed, the smaller the amount of electric power required to be supplied to the electric actuator. In view of this, in the present invention, the vehicle-speed-information obtaining means obtains vehicle speed information, and the target-charged-amount setting means sets the target charged amount on the basis of the obtained vehicle speed information. For example, the target-charged-amount setting means sets the target charged amount on the basis of the obtained vehicle speed information such that the target charged amount decreases as the vehicle speed increases. By virtue of this configuration, the target charged amount is properly set, and the service life of the secondary power supply apparatus can be extended further.

Another feature of the present invention resides in that the charged amount detection means includes charge/discharge current cumulating means for obtaining a cumulative value of a charge/discharge current flowing to or from the secondary power supply apparatus during a period in which an ignition switch of the vehicle is on; and end-time discharge means, operable when the ignition switch is turned off, for discharging an electric charge of the secondary power supply apparatus to the primary power supply apparatus.

In this invention, the charge/discharge current cumulating means obtains a cumulative value of a charge/discharge current flowing to or from the secondary power supply apparatus during a period in which the ignition switch is on, and the charged amount of the secondary power supply apparatus is detected on the basis of the cumulative value. When the vehicle is not used for a long period of time, the charged amount of the secondary power supply apparatus changes due to natural discharge or the like. In view of this, in the present invention, when the ignition switch is turned off, the end-time discharge means discharges the electric charge of the secondary power supply apparatus to the primary power supply apparatus. Accordingly, the initial charged amount at the time when the cumulation of the charge/discharge current is started is less likely to vary, whereby the charged amount can be detected accurately. Further, since the electric charge is discharged when the vehicle is not used, when the secondary power supply apparatus is composed of a capacitor, the service life of the secondary power supply apparatus can be extended.

BRIEF DESCRIPTION OF THE DRAWINGS

FIG. 8 is a pair of graphs showing change in electric power charged into the secondary power supply apparatus and change in the charged amount.

BEST MODE FOR CARRYING OUT THE INVENTION

Figure 1:
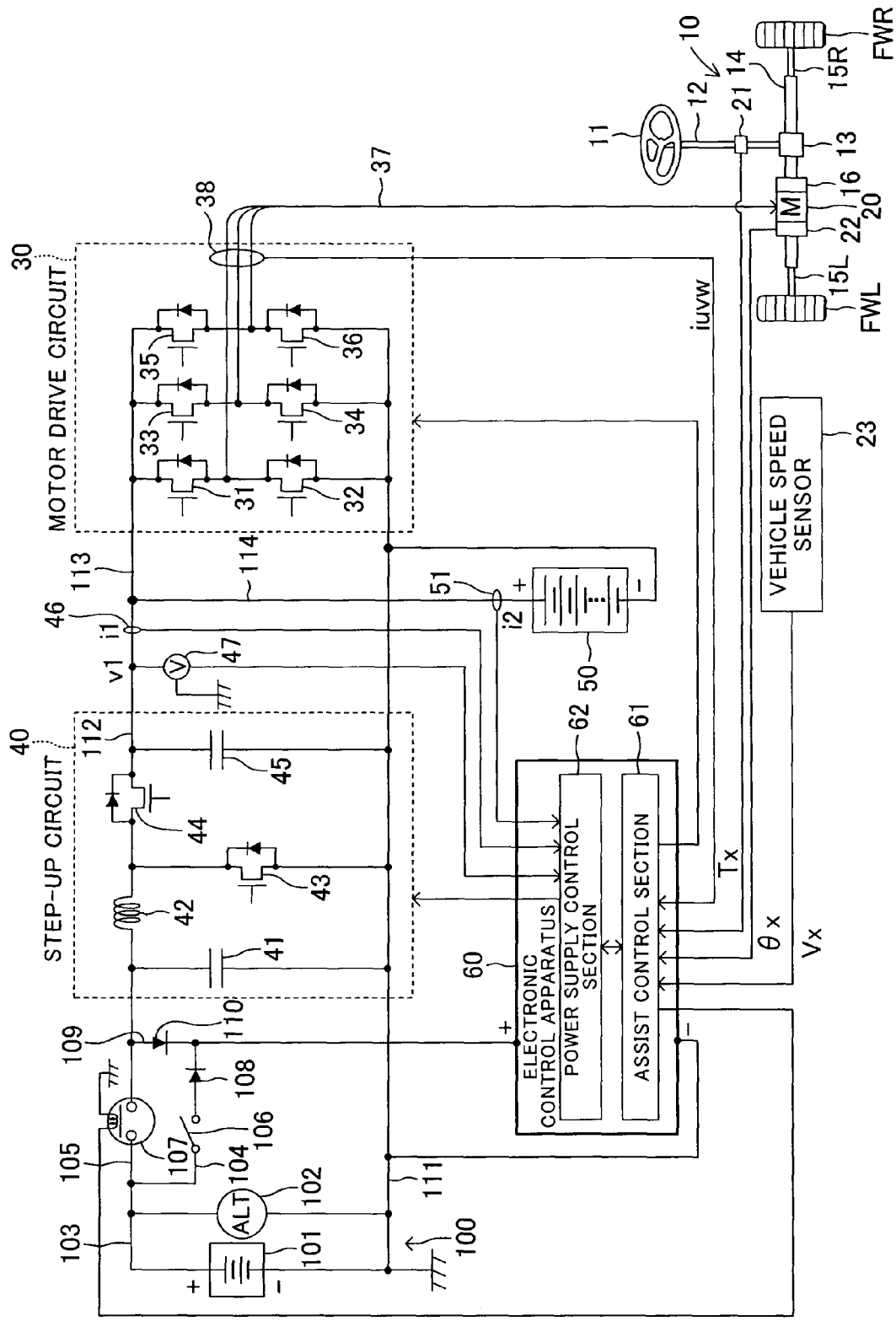
FIG. 1 is a schematic diagram of an electric power steering apparatus equipped with a power supply control apparatus according to an embodiment of the present invention.

A power supply control apparatus according to one embodiment of the invention will now be described with reference to the drawings. FIG. 1 schematically shows the configuration of an electric power steering apparatus for a vehicle equipped with a power supply control apparatus according to the embodiment.

The electric power steering apparatus for a vehicle according to the embodiment is mainly composed of a steering mechanism 10 which steers steerable wheels in accordance with steering operation of a steering wheel 11; an electric motor 20 incorporated in the steering mechanism 10 and adapted to generate steering assist torque; a motor drive circuit 30 for driving the electric motor 20; a step-up circuit 40 which steps up an output voltage of a primary power supply apparatus 100 and supplies the stepped-up voltage to the motor drive circuit 30; a secondary power supply apparatus 50 connected in parallel with a power supply circuit extending between the step-up circuit 40 and the motor drive circuit 30; and an electronic control apparatus 60 which controls operations of the electric motor 20 and the step-up circuit 40.

The steering mechanism 10, which steers left and right front wheels FWL and FWR in response to a rotation operation of the steering wheel 11, includes a steering shaft 12 whose upper end is connected to the steering wheel 11 for integral rotation therewith. A pinion gear 13 is connected to the lower end of the shaft 12 for integral rotation therewith. The pinion gear 13 is in meshing engagement with rack teeth formed on a rack bar 14, and constitutes a rack and pinion mechanism in cooperation with the rack bar 14. Knuckles (not shown) of the left and right front wheels FWL and FWR are steerably connected to opposite ends of the rack bar 14 via tie rods 15L and 15R. The left and right front wheels FWL and FWR are steered leftward or rightward in accordance with an axial displacement of the rack bar 14 resulting from rotation of the steering shaft 12 about its axis.

The electric motor 20 for steering assist is assembled to the rack bar 14. A rotary shaft of the electric motor 20 is connected to the rack bar 14 via a ball-screw mechanism 16 in a power transmissible manner. As a result of rotation of the rotary shaft of the electric motor 20, a steering force is applied to the left and right front wheels FWL and FWR so as to assist the steering operation. The ball-screw mechanism 16 serves as a speed reducer and a rotation-rectilinear motion converter. The ball-screw mechanism 16 reduces the rotational speed of the electric motor 20, converts rotation of the electric motor 20 to a rectilinear motion, and transmits the rectilinear motion to the rack bar 14.

A steering torque sensor 21 is provided on the steering shaft 12. The steering torque sensor 21 outputs a signal corresponding to a steering torque which acts on the steering shaft 12 as a result of the steering wheel 11 being rotated. Hereinafter, the value of steering torque detected on the basis of the signal output from the steering torque sensor 21 will be referred to as "steering torque Tx." The direction in which the steering wheel 11 is rotated is determined on the basis of the polarity of the steering torque Tx; i.e., whether the steering torque Tx is positive or negative.

A rotational angle sensor 22 is provided for the electric motor 20. This rotational angle sensor 22 is incorporated into the electric motor 20, and outputs a detection signal corresponding to the rotational angle position of the rotor of the electric motor 20. The detection signal output from the rotational angle sensor 22 is used for calculation of rotational angle and rotational angular velocity of the electric motor 20. Meanwhile, since the rotational angle of the electric motor 20 is in proportion to the steering angle of the steering wheel 11, the rotational angle of the electric motor 20 is also used as the steering angle of the steering wheel 11. Further, since a rotational angular velocity, which is obtained by differentiating the rotational angle of the electric motor 20 with respect to time, is in proportion to the steering angular velocity of the steering wheel 11, the rotational angular velocity of the electric motor 20 is also used as the steering angular velocity of the steering wheel 11. Hereinbelow, a value of steering angle of the steering wheel 11 detected on the basis of the output signal from the rotational angle sensor 22 will be referred to as "steering angle $\theta x$," and a value of steering angular velocity obtained by differentiating the steering angle $\theta x$ with respect to time will be referred to as "steering angular velocity $\omega$. Positive and negative values of the steering angle $\theta x$ represent clockwise and counterclockwise steering angles, respectively, of the steering wheel 11 in relation to its neutral position.

The motor drive circuit 30 is a three-phase inverter circuit formed by six switching elements (MOSFETs) 31 to 36.

Specifically, a circuit including serially connected first and second switching elements 31 and 32, a circuit including serially connected third and fourth switching elements 33 and 34, and a circuit including serially connected fifth and sixth switching elements 35 and 36 are connected in parallel. Power supply lines 37 for supplying electric power to the electric motor 20 are connected to nodes between the upper and lower switching elements (31 and 32, 33 and 34, and 35 and 36) of the respective serial circuits.

The drains of the first switching element 31, the third switching element 33, and the fifth switching element 35 are connected to a stepped-up voltage drive line 113 to be described later; and the sources of the second switching element 32, the fourth switching element 34, and the sixth switching element 36 are connected to a ground line 111. A current sensor 38 is provided on a power supply line 37 extending from the motor drive circuit 30 to the electric motor 20. This current sensor 38 detects (measures) phase currents, and outputs to the electronic control apparatus 60 a detection signal corresponding to the detected currents. Hereinafter, the detected currents will be referred to as the "motor current iuvw". Further, this current sensor 38 will be referred to as the "motor current sensor 38".

The gates of the switching elements 31 to 36 are connected to the electronic control apparatus 60, and the duty ratios of the switching elements 31 to 36 are controlled in accordance with PWM control signals from the electronic control apparatus 60. Thus, voltages for driving the electric motor 20 are adjusted to a target voltage.

Notably, as indicated by circuit symbols in FIG. 1, MOSFETs which constitute the switching elements 31 to 36 have parasitic diodes in an inverse-parallel connection.

Next, a power supply system of the electric power steering apparatus will be described.

The electric power steering apparatus receives electric power from the primary power supply apparatus 100. The primary power supply apparatus 100 is composed of a primary battery 101 and an alternator 102 connected in parallel with each other. The alternator 102 is rotated by an engine, whereby the alternator 102 generates electricity. An ordinary car battery whose rated output voltage is 12 V is used as the primary battery 101.

This primary power supply apparatus 100 supplies electric power not only to the electric power steering apparatus but also to other electrical loads mounted on the vehicle. A power supply source line 103 connected to the power supply terminal (+ terminal) of the primary battery 101 branches into a control-system power supply line 104 and a drive-system power supply line 105. The control-system power supply line 104 functions as a power supply line for supplying electric power to only the electronic control apparatus 60. The drive-system power supply line 105 functions as a power supply line for supplying electric power to both the motor drive circuit 30 and the electronic control apparatus 60.

An ignition switch 106 is provided in the control-system power supply line 104. A power supply relay 107 is provided in the drive-system power supply line 105. The power supply relay 107 operates as follows. In response to a control signal from the electronic control apparatus 60, the power supply relay 107 turns on and forms a circuit for supplying electric power to the electric motor 20. The control-system power supply line 104 is connected to a power supply+terminal of the electronic control apparatus 60, and includes a diode 108 provided on the load side (the electronic control apparatus 60 side) of the ignition switch 106. This diode 108 is provided in such an orientation that its cathode is connected to the electronic control apparatus 60 and its anode is connected to the primary power supply apparatus 100 via the ignition switch 106. The diode 108 serves as a reverse flow prevention element which allows a flow of electricity only in the power supply direction.

A connection line 109 branches off from the drive-system power supply line 105 at a point on the load side of the power supply relay 107, and is connected to the control-system power supply line 104. This connection line 109 is connected to the control-system power supply line 104 at a point between the diode 108 and the electronic control apparatus 60. Further, a diode 110 is provided in the connection line 109. This diode 110 is provided in such an orientation that its cathode is connected to the control-system power supply line 104 and its anode is connected to the drive-system power supply line 105. Accordingly, although electric power can be supplied from the drive-system power supply line 105 to the control-system power supply line 104 via the connection line 109, electric power cannot be supplied from the control-system power supply line 104 to the drive-system power supply line 105. The drive-system power supply line 105 and the ground line 111 are connected to the step-up circuit 40. Further, the ground line 111 is connected to the ground terminal of the electronic control apparatus 60.

The step-up circuit 40 is composed of a capacitor 41 provided between the drive-system power supply line 105 and the ground line 111; a step-up coil 42 provided in series in the drive-system power supply line 105 to be located on the load side with respect to the connection point of the capacitor 41; a first step-up switching element 43 provided between the ground line 111 and a node on the drive-system power supply line 105 located on the load side with respect to the step-up coil 42; a second step-up switching element 44 provided in series in a portion of the drive-system power supply line 105 located on the load side with respect to the connection point of the first step-up switching element 43; and a capacitor 45 provided between the ground line 111 and a node on the drive-system power supply line 105 located on the load side with respect to the second step-up switching element 44. A stepped-up voltage power supply line 112 is connected to the secondary side of the step-up circuit 40.

In the present embodiment, MOSFETs are used for the step-up switching elements 43 and 44. However, other switching elements may be used. Further, as indicated by circuit symbols in FIG. 1, MOSFETs which constitute the step-up switching elements 43 and 44 have parasitic diodes.

The power supply control section 62 (to be described later) of the electronic control apparatus 60 controls the stepped-up voltage of the step-up circuit 40. The power supply control section 62 outputs pulse signals having a predetermined period to the gates of the first and second step-up switching elements 43 and 44 to thereby turn the step-up switching elements 43 and 44 on and off. Thus, the step-up circuit 40 steps up the voltage supplied from the primary power supply apparatus 100, and generates a predetermined output voltage to the stepped-up voltage power supply line 112. In this case, the first and second step-up switching elements 43 and 44 are controlled in such a manner that when the first element is on the second element is off and when the first element is off the second element is on. The step-up circuit 40 operates as follows. First, the first step-up switching element 43 is turned on and the second step-up switching element 44 is turned off so as to cause current to flow through the step-up coil 42 for a short period of time, to thereby accumulate electric power in the step-up coil 42. Immediately after that, the first step-up switching element 43 is turned off and the second step-up switching element 44 is turned on, whereby the electric power accumulated in the step-up coil 42 is output.

The output voltage of the second step-up switching element 44 is smoothed by the capacitor 45. Accordingly, a stable stepped-up voltage is output from the stepped-up voltage power supply line 112. In this case, a plurality of capacitors which differ in frequency characteristic may be connected in parallel so as to improve the smoothing performance. Further, the capacitor 41 provided on the input side of the step-up circuit 40 removes noise transmitted to the primary power supply apparatus 100.

The output voltage (stepped-up voltage) of the step-up circuit 40 can be adjusted through control of the duty ratios of the first and second step-up switching elements 43 and 44. The greater the on-duty ratio of the second step-up switching element 44, the higher the stepped-up voltage. The step-up circuit 40 of the present embodiment is configured to enable the stepped-up voltage to be adjusted within a range of, for example, 20 V to 50 V. Notably, a general purpose DC-DC converter may be used as the step-up circuit 40.

A current sensor 46 for detecting the output current of the step up circuit 40 and a voltage sensor 47 for detecting the output voltage of the step up circuit 40 are provided for the stepped-up voltage power supply line 112 located on the output side of the step-up circuit 40. The current sensor 46 and the voltage sensor 47 are connected to the power supply control section 62 of the electronic control apparatus 60, and outputs to the power supply control section 62 signals representing a current i1 and a voltage v1, respectively, which are measured values. In the following description, the current sensor 46 is called the primary current sensor 46; and the voltage sensor 47 is called the primary voltage sensor 47. Notably, the primary current sensor 46 is used in a modification to be described later, and may be omitted in this embodiment.

The stepped-up voltage power supply line 112 branches into a stepped-up voltage drive line 113 and a charge/discharge line 114. The stepped-up voltage drive line 113 is connected to a power supply input section of the motor drive circuit 30. The charge/discharge line 114 is connected to a plus terminal of the secondary power supply apparatus 50.

The secondary power supply apparatus 50 is a high-voltage storage apparatus into which electric power output from the step-up circuit 40 is charged and which supplies electric power to the motor drive circuit 30 so as to assist the primary power supply apparatus 100 when the motor drive circuit 30 requires a large amount of electric power. Accordingly, the secondary power supply apparatus 50 is configured by serially connecting a plurality of electricity storage cells such that the secondary power supply apparatus 50 can maintain a voltage corresponding to the output voltage of the step-up circuit 40. For example, a capacitor (an electric double layer capacitor) can be used as the secondary power supply apparatus 50.

The ground terminal of the secondary power supply apparatus 50 is connected to the ground line 111. Further, a current sensor 51 for detecting charge/discharge current flowing to or from the secondary power supply apparatus 50 is provided on the charge/discharge line 114. The current sensor 51 is connected to the power supply control section 62 of the electronic control apparatus 60, and outputs to the power supply control section 62 a signal representing a charge/discharge current i2, which is a measured value. The current sensor 51 distinguishes the flow direction of current; i.e., charge current flowing from the step-up circuit 40 to the secondary power supply apparatus 50 and discharge current flowing from the secondary power supply apparatus 50 to the motor drive circuit 30, and measures the magnitude of the charge or discharge current. The charge/discharge current i2 assumes a positive value when the current is a charge current, and assumes a negative value when the current is a discharge current. In the following description, the current sensor 51 will be referred to as the secondary current sensor 51, and the current measured by the secondary current sensor 51 will be referred to as actual charge/discharge current i2.

The electronic control apparatus 60 is mainly formed of a microcomputer including a CPU, ROM, RAM, etc., and is functionally divided into an assist control section 61 and the power supply control section 62. The steering torque sensor 21, the rotational angle sensor 22, the motor current sensor 38, and the vehicle speed sensor 23 are connected to the assist control section 61, so that the assist control section 61 can receive sensor signals representing the steering torque Tx, the steering angle θx, the motor current iuvw, and the vehicle speed Vx, respectively. On the basis of these sensor signals, the assist control section 61 outputs a PWM control signal to the motor drive circuit 30 so as to drive and control the electric motor 20, to thereby assist the driver's steering operation.

The power supply control section 62 controls the charging and discharging of the secondary power supply apparatus 50 by controlling the step-up operation of the step-up circuit 40. The primary voltage sensor 47, the primary current sensor 46, and the secondary current sensor 51 are connected to the power supply control section 62 so as to supply to the power supply control section 62 sensor signals representing the stepped-up voltage v1, the output current i1 of the step-up circuit and the charge/discharge current i2, respectively. On the basis of these sensor signals, the power supply control section 62 outputs a PWM control signal to the step-up circuit 40. The step-up circuit 40 changes the stepped-up voltage, which is the output voltage of the step-up circuit 40, by controlling the duty ratios of the first and second step-up switching elements 43 and 44 in accordance with the input PWM control signal.

Figure 2:
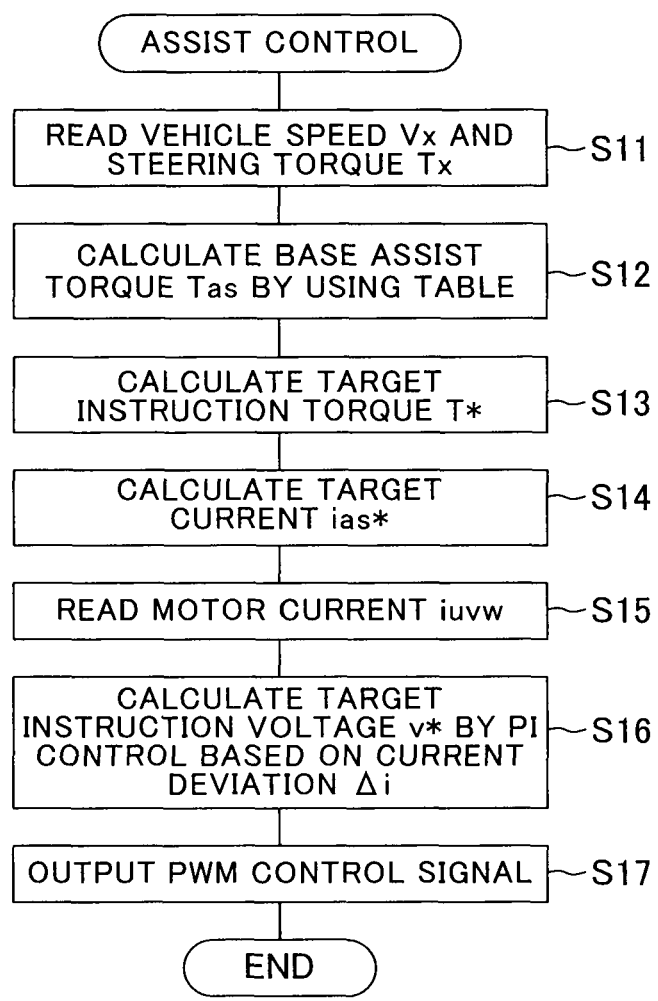
FIG. 2 is a flowchart showing a steering assist control routine.

Next, steering assist control processing performed by the assist control section 61 of the electronic control apparatus 60 will be described. FIG. 2 shows a steering assist control routine which is stored in the ROM of the electronic control apparatus 60 as a control program and executed by the assist control section 61. The steering assist control routine is started when the ignition switch 106 is turned on, and is repeatedly executed at predetermined short intervals.

When the present control routine is started, in step S11, the assist control section 61 first reads the vehicle speed Vx detected by the vehicle speed sensor 23 and the steering torque Tx detected by the steering torque sensor 21.

Figure 3:
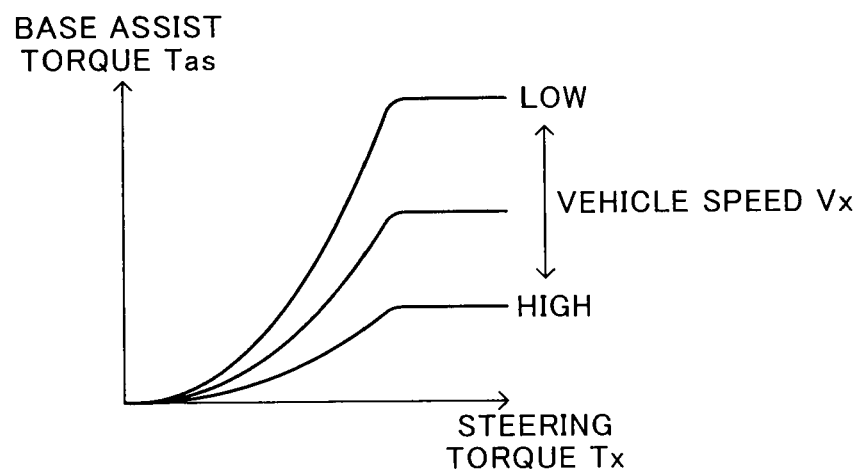
FIG. 3 is a graph representing an assist torque table.

Subsequently, in step S12, with reference to an assist torque table shown in FIG. 3, the assist control section 61 calculates a base assist torque Tas set in accordance with the input vehicle speed Vx and steering torque Tx. The assist torque table is stored in the ROM of the electronic control apparatus 60, and is set such that the base assist torque Tas increases as the steering torque Tx increases, and the lower the vehicle speed Vx, the greater the value of the base assist torque Tas. The assist torque table of FIG. 3 shows only changes in the base assist torque Tas with the steering torque Tx in the clockwise direction. However, changes in the base assist torque Tas with the steering torque Tx in the counterclockwise direction are identical with those shown in FIG. 3. Although the directions (polarities) of the steering torque Tx and the base assist torque Tas are opposite, the absolute values of the base assist torque Tas and the steering torque Tx are the same.

Subsequently, in step S13, the assist control section 61 calculates a target instruction torque T* by adding a compensation torque to the base assist torque Tas. This compensation torque is calculated as the sum of a return force with which the steering shaft 12 is returned to its base position and which increases in proportion to the steering angle θx and a return torque which corresponds to a resisting force against rotation of the steering shaft 12 and which increases in proportion to the steering angular velocity ω. The assist control section 61 performs this calculation while using the rotational angle of the electric motor 20 detected by the rotational angle sensor 22 (corresponding to the steering angle θx of the steering wheel 11). Further, the steering angular velocity ω is obtained by differentiating the steering angle θx of the steering wheel 11 with respect to time.

Next, in step S14, the assist control section 61 calculates a target current ias* which is proportional to the target instruction torque T*. The target current ias* is obtained by dividing the target instruction torque T* by a torque constant.

Subsequently, in step S15, the assist control section 61 reads the detection signal output from the motor current sensor 38 and representing the motor current iuvw flowing through the electric motor 20. Subsequently, in step S16, the assist control section 61 calculates a deviation Δi between the motor current iuvw and the previously calculated target current ias*, and calculates a target instruction voltage v* by means of PI control (proportional integral control) performed on the basis of the deviation Δi.

In step S17, the assist control section 61 outputs to the motor drive circuit 30 a PWM control voltage signal corresponding to the target instruction voltage v*, and ends the current execution of the present control routine. The present control routine is repeatedly executed at predetermined short intervals. Accordingly, through execution of the present control routine, the duty ratios of the switching elements 31 to 36 of the motor drive circuit 30 are controlled, whereby a desired assist torque corresponding to a driver's steering operation is attained.

During execution of such steering assist control, in particular, at the time of stationary swing or at the time when the steering wheel is operated during low-speed traveling, a large amount of electric power is needed. However, increasing the capacity of the primary power supply apparatus 100 for temporary large power consumption is not preferred. In view of this, in the electric power steering apparatus of the present embodiment, the capacity of the primary power supply apparatus 100 is not increased, and the secondary power supply apparatus 50 is provided in order to supplement the supply of electric power when a large amount of electric power is consumed temporarily. Further, the step-up circuit 40 is provided so as to efficiently drive the electric motor 20, and constitute a system for supplying the stepped-up voltage to the motor drive circuit 30 and the secondary power supply apparatus 50.

When such a power supply system is configured, the performance (assist performance) of the electric power steering apparatus can be fully used through use of both the primary power supply apparatus 100 and the secondary power supply apparatus 50. Therefore, in order to secure the designed assist performance, the secondary power supply apparatus 50 must be maintained in a good state. When charging is performed excessively or charging and discharging are repeated frequently, the secondary power supply apparatus 50 deteriorates quickly, whereby the service life of the secondary power supply apparatus 50 becomes short. Further, when the charged amount of the secondary power supply apparatus 50 (the amount of electricity charged into secondary power supply apparatus 50) is insufficient, the designed assist performance cannot be attained.

In view of the above, the power supply control section 62 of the electronic control apparatus 60 controls the charging/discharging (charging and discharging) of the secondary power supply apparatus 50 by controlling the stepped-up voltage by making use of the step-up circuit 40, to thereby maintain the secondary power supply apparatus 50 in as good a state as possible.

Figure 4:
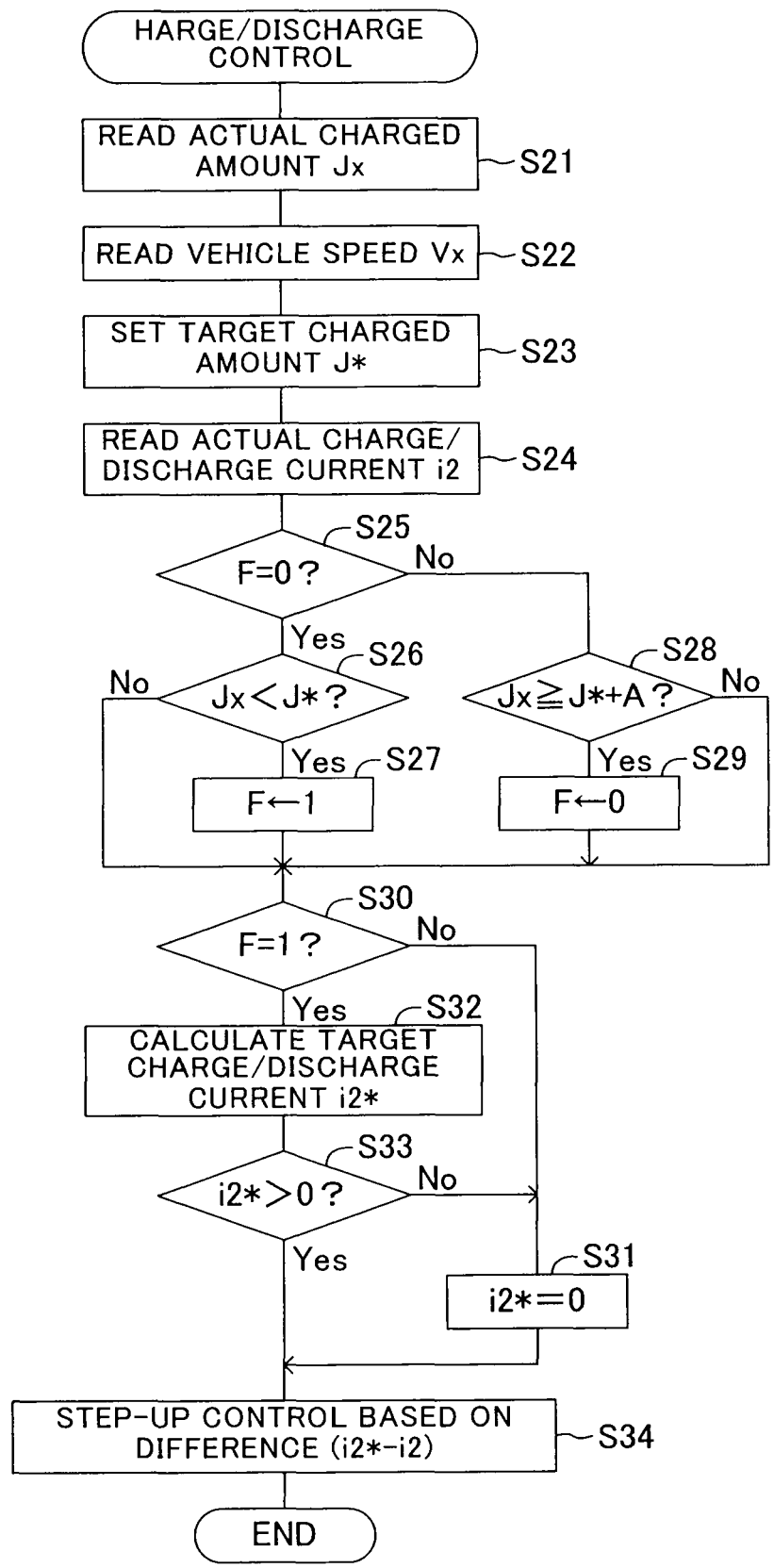
FIG. 4 is a flowchart showing a charge/discharge control routine.

Charge/discharge control processing performed by the power supply control section 62 of the electronic control apparatus 60 will now be described. FIG. 4 shows a charge/discharge control routine which is stored in the ROM of the electronic control apparatus 60 as a control program and executed by the power supply control section 62. The charge/discharge control routine is started when the ignition switch 106 is turned on, and is repeatedly executed at predetermined short intervals.

When the present control routine is started, in step S21, the power supply control section 62 reads data representing an actual charged amount Jx, which is the amount of electricity actually charged in the secondary power supply apparatus 50. This actual charged amount Jx is regularly calculated by an actual-charged amount detection routine (FIG. 6), which will be described later. Accordingly, this step S21 provides processing of reading data representing the latest actual charged amount Jx calculated by the actual-charged amount detection routine.

Figure 5:
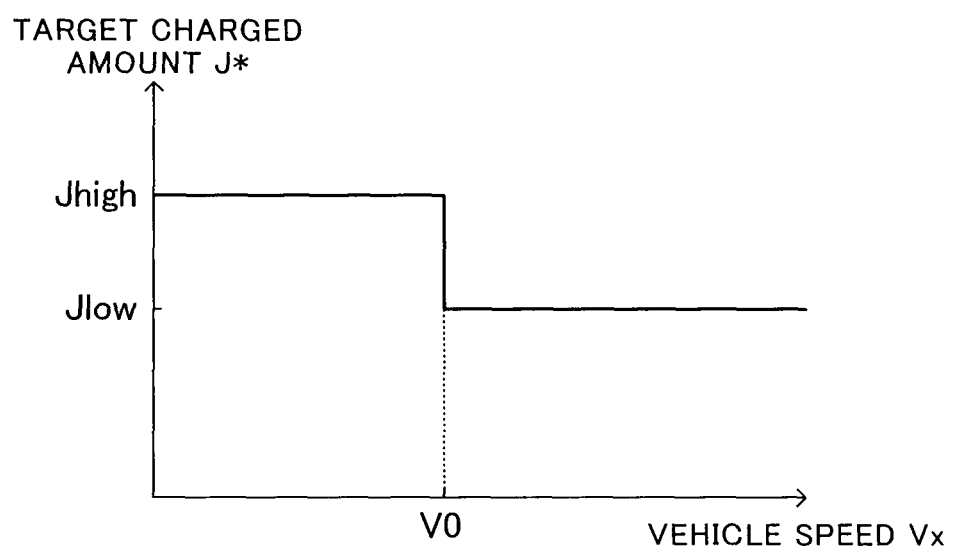
FIG. 5 is a graph showing the relation between vehicle speed and target charged amount.

Next, in step S22, the power supply control section 62 reads the vehicle speed Vx detected by the vehicle speed sensor 23. Subsequently, in step S23, the power supply control section 62 sets a target charged amount J* corresponding to the vehicle speed Vx. This target charged amount J* is an optimal amount of electricity to be charged into the secondary power supply apparatus 50. As shown in FIG. 5, a target charged amount Jhigh is selected when the vehicle speed Vx is lower than a reference vehicle speed V0, and a target charged amount Jlow, which is less than the target charged amount Jhigh, is selected when the vehicle speed Vx is equal to or higher than the reference vehicle speed V0. Notably, the secondary power supply apparatus 50 has a sufficiently large battery capacity such that the target charged amount J* is not excessive for the secondary power supply apparatus 50.

When the above-described steering assist control is performed, as shown in FIG. 3, the lower the vehicle speed Vx, the higher the set base assist torque Tas, so that the power consumption of the drive circuit 30 (electric power consumed for drive of the electric motor 20) becomes larger. In view of this, this charge/discharge control routine sets the target charged amount J* of the secondary power supply apparatus 50 in accordance with the vehicle speed Vx. In the present embodiment, the target charged amount J* is set to one of two values. However, the target charged amount J* may be set to one of three or more values or set such that it changes continuously in accordance with the vehicle speed, so long as the target charged amount J* decreases as the vehicle speed Vx increases. Notably, the target charged amount J* may be a fixed value.

After setting the target charged amount J*, in step S24, the power supply control section 62 reads the actual charge/discharge current i2 detected by the secondary current sensor 51. Next, in step S25, the power supply control section 62 determines whether or not the flag F is "0." As can be understood from the processing to be described later, the flag F represents whether or not the charged amount of the secondary power supply apparatus 50 is sufficient. When the flag F is "0," this represents that the charged amount is sufficient (charging is unnecessary). When the flag F is "1," this represents that the charged amount is insufficient (charging is necessary). Notably, the flag F is set to "0" when the present charge/discharge control routine is started.

When the flag F is "0" (S25: YES), the power supply control section 62 proceeds to step S26, and determines whether or not the actual charged amount Jx is less than the target charged amount J*. In this step S26, the power supply control section 62 determines whether or not the charged amount of the secondary power supply apparatus 50 has become insufficient. When Jx<J* (S26: YES), the power supply control section 62 determines that the charged amount has become insufficient, and sets the flag F to "1" in step S27. Meanwhile, when Jx≤J* (S26: NO), the power supply control section 62 determines that the charged amount is not insufficient, and does not change the value of the flag F. Accordingly, the flag F is maintained at "0."

When the power supply control section 62 determines in step S25 that the flag F is "1" (S25: NO), the power supply control section 62 proceeds to step S28, and determines whether or not the actual charged amount Jx has reached a charged amount (J*+A) obtained through addition of a dead band value A (positive value) to the target charged amount J*. In this step S28, the power supply control section 62 determines whether or not the state in which the charged amount of the secondary power supply apparatus 50 is insufficient has ended. When Jx≤J*+A (S28: YES), the power supply control section 62 determines that the insufficiently charged state has ended, and sets the flag F to "0" in step S29. Meanwhile, when Jx≤J*+A (S28: NO), the power supply control section 62 determines that the charged amount is insufficient, and does no change the value of the flag F. Accordingly, the flag F is maintained at "1."

The dead band value A is set so as to prevent frequent change in the result of comparison between the actual charged amount Jx and the target charged amount J* (the result of determination as to whether or not charging is necessary). Notably, the target charged amount J* corresponds to the first target value of the present invention, and the charged amount (J*+A), obtained through addition of the dead band value A (positive value) to the target charged amount J*, corresponds to the second target value of the present invention.

After having set the flag F as described above, in step S30, the power supply control section 62 checks the state of the flag F. When power supply control section 62 determines that the flag F is "0" (S30: NO); that is, determines that the charged amount of the secondary power supply apparatus 50 is sufficient, the power supply control section 62 proceeds to step S31, and sets a target charge/discharge current i2* to zero (i2=0). Meanwhile, when the power supply control section 62 determines that the flag F is "1" (S30: YES); that is, determines that the charged amount of the secondary power supply apparatus 50 is insufficient, the power supply control section 62 proceeds to step S32, and obtains the target charge/discharge current i2* through calculation as follows.

$$i2^* = (Wlim - Wx)/v1n-1$$

Here, Wlim represents an available electric power output of the step-up circuit 40, Wx represents a power consumption of the motor drive circuit 30, and v1n−1 represents a previous stepped-up voltage. The previous stepped-up voltage refers to the stepped-up voltage of the step-up circuit 40 in the previously execution cycle of the present control routine, which is repeated at predetermined intervals. In this case, the previous stepped-up voltage v1n−1 may be the voltage v1 detected by the primary voltage sensor 47 or a control value in a feedback control to be described later. At the time of startup of the present control routine, a previously set initial value (e.g., 12 V) is used as the previous stepped-up voltage v1n−1. The available electric power output Wlim is a value previously set on the basis of the specifications of the step-up circuit 40. The power consumption Wx of the motor drive circuit 30 is calculated as the product of the stepped-up voltage v1 detected by the primary voltage sensor 47 and the motor current iuvw detected by the motor current sensor 38. Accordingly, the processing in this step S32 includes processing for reading the voltage measured by the primary voltage sensor 47 and processing for reading the current measured by the motor current sensor 38.

Subsequently, in step S33, the power supply control section 62 determines whether or not the target charge/discharge current i2* is positive. As described above, the target charge/discharge current i2* is obtained by means of subtracting the power consumption Wx of the motor drive circuit 30 from the available electric power output Wlim of the step-up circuit 40 and dividing the resultant value by the previous stepped-up voltage v1n−1. Accordingly, when the power consumption Wx of the electric motor 20 is less than the available electric power output Wlim of the step-up circuit 40, i2* is greater than zero (S33: YES), and when the power consumption Wx of the drive circuit 30 is equal to or greater than the available electric power output Wlim of the step-up circuit 40, i2* is equal to or less than zero (S33: NO).

When the target charge/discharge current i2* is equal to or less than zero (i2*≤0), in step S31, the power supply control section 62 newly sets the target charge/discharge current i2* to zero (i2*=0). Meanwhile, when the target charge/discharge current i2* is positive (i2*>0), the power supply control section 62 does not change the target charge/discharge current i2* calculated in the previous step S32.

After having set the target charge/discharge current i2* in this manner, the power supply control section 62 proceeds to step S34. In step S34, the power supply control section 62 feedback-controls the stepped-up voltage of the step-up circuit 40 on the basis of the deviation of the actual charge/discharge current i2 from the target charge/discharge current i2*. That is, the power supply control section 62 controls the stepped-up voltage of the step-up circuit 40 such that the deviation (i2*−i2) of the actual charge/discharge current i2 from the target charge/discharge current i2* decreases. In the present embodiment, the power supply control section 62 performs PID control based on the deviation (i2*−i2).

The power supply control section 62 outputs pulse signals of a predetermined period to the gates of the first and second step-up switching elements 43 and 44 of the step-up circuit 40 so as to turn on and off the first and second step-up switching elements 43 and 44, to thereby step up the voltage supplied from the primary power supply apparatus 100. Further, the power supply control section 62 controls the stepped-up voltage by changing the duty ratios of the pulse signals.

In this case, when the target charge/discharge current i2* is positive (i2>0), the stepped-up voltage is controlled such that a current flows in a charge direction; i.e., toward the secondary power supply apparatus 50, and the magnitude of the current coincides with the target charge/discharge current i2*. Accordingly, the stepped-up voltage output from the step-up circuit 40 is controlled to become higher than the power supply voltage of the secondary power supply apparatus 50. That is, when the actual charged amount Jx has not yet reached the target charged amount J* and the output of the step-up circuit 40 has a margin in relation to the power consumption of the motor drive circuit 30, the electric power of the primary power supply apparatus 100 is charged into the secondary power supply apparatus 50 via the step-up circuit 40. In addition, since the target charge/discharge current i2* is set to perform the charging by fully using the power supply capacity of the step-up circuit 40, while securing the electric power to be supplied to the motor drive circuit 30, the secondary power supply apparatus 50 can be charged quickly.

Meanwhile, when the target charge/discharge current i2* is set to zero (i2=0), the stepped-up voltage of the step-up circuit 40 is controlled such that neither charge current nor discharge current flows to or from the secondary power supply apparatus 50. Accordingly, the stepped-up voltage of the step-up circuit 40 is controlled to a voltage equal to the power supply voltage of the secondary power supply apparatus 50. Therefore, the secondary power supply apparatus 50 is not charged. Unless the power consumption of the motor drive circuit 30 exceeds the output capacity of the step-up circuit 40, the stepped-up voltage is maintained such that discharge current does not flow from the secondary power supply apparatus 50, and the motor drive circuit 30 operates through use of only the electric power output from the step-up circuit 40. When the power consumption of the motor drive circuit 30 exceeds the output capacity limit of the step-up circuit 40, irrespective of the step-up control, the discharge current of the secondary power supply apparatus 50 cannot be maintained at zero, whereby the stepped-up voltage drops. As a result, electric power is supplied from the secondary power supply apparatus 50 to the motor drive circuit 30 so as to make up for the shortage. That is, when the power consumption of the motor drive circuit 30 is less than the output capacity of the step-up circuit 40, the electric power of the secondary power supply apparatus 50 is not used; and, only when the motor drive circuit 30 requires a large amount of electric power greater than the output capacity, electric power is supplied to the motor drive circuit 30 from the secondary power supply apparatus 50 in addition to the primary power supply apparatus 100.

The current execution of the present charge/discharge control routine is ended after completion of the feedback control in step S34. After that, the charge/discharge control routine is repeatedly executed at predetermined short intervals. In the present embodiment, as will be described later, there is performed a control (FIG. 9) for discharging the electric charge charged in the secondary power supply apparatus 50 to the primary battery 101, when the ignition switch 106 is turned off. Accordingly, the actual charged amount Jx at the time of startup of the vehicle is less than the target charged amount J*. Therefore, when the present charge/discharge control routine is started, a "YES" determination is made in step S26, and the flag F is set to "1." Accordingly, so long as the power consumption of the motor drive circuit 30 is less than the available electric power output of the step-up circuit 40, the secondary power supply apparatus 50 is charged by the electric power output from the step-up circuit 40.

During execution of the charge/discharge control routine, the charge state of the secondary power supply apparatus 50 is repeatedly determined. When the charged amount of the secondary power supply apparatus 50 increases as a result of such charge/discharge control and the detected actual charged amount Jx reaches the charged amount calculated through addition of the dead band value A to the target charged amount J* (S28: YES), the flag F is set to "0" (S29), and the target charge/discharge current i2* is set to zero.

When the flag F is "0," charging of electricity to the secondary power supply apparatus 50 is unnecessary. Therefore, the stepped-up voltage of the step-up circuit 40 is feedback-controlled with the target charge/discharge current i2* set to zero. In this case, when the electric motor 20 is not driven, current flows from neither the step-up circuit 40 nor the secondary power supply apparatus 50 to the motor drive circuit 30. Therefore, the step-up operation of the step-up circuit 40 can be stopped so as to prevent the charge/discharge current from flowing to or from the secondary power supply apparatus 50. For example, the power supply control section 62 confirms that the motor current iuvw detected by the motor current sensor 38 is zero, and maintains the first and second step-up switching elements 43 and 44 of the step-up circuit 40 in an off state. Accordingly, consumption of energy required for the step-up operation can be suppressed.

When the motor drive circuit 30 starts to operate in this state, a discharge current flows from the secondary power supply apparatus 50 to the motor drive circuit 30. Therefore, by virtue of the feedback control, the step-up operation of the step-up circuit 40 is started such that the actual charge/discharge current i2 becomes zero. As a result, the stepped-up voltage of the step-up circuit 40 is controlled to a voltage equal to the power supply voltage of the secondary power supply apparatus 50, whereby charging/discharging of the secondary power supply apparatus 50 are instantaneously restricted. In this case as well, unless the power consumption of the motor drive circuit 30 exceeds the output capacity limit of the step-up circuit 40, supply of electric power from the secondary power supply apparatus 50 is stopped, and, only when the power consumption of the motor drive circuit 30 exceeds the output capacity limit of the step-up circuit 40, electricity is supplied from the secondary power supply apparatus 50 in an amount corresponding to the shortage of electric power.

Further, even after charging of electricity to the secondary power supply apparatus 50 has been determined to be unnecessary, when the actual charged amount Jx of the secondary power supply apparatus 50 falls below the target charged amount J*, the flag F is changed to "1." In this case, if the output of the step-up circuit 40 has a margin, a positive target charge/discharge current i2* is set, whereby the secondary power supply apparatus 50 is charged by the surplus electric power. Further, when the output of the step-up circuit 40 has no margin, the target charge/discharge current i2* is set to zero so as to restrict the charging of the secondary power supply apparatus 50 and supply electricity from the secondary power supply apparatus 50 to thereby make up for the shortage.

Figure 7:
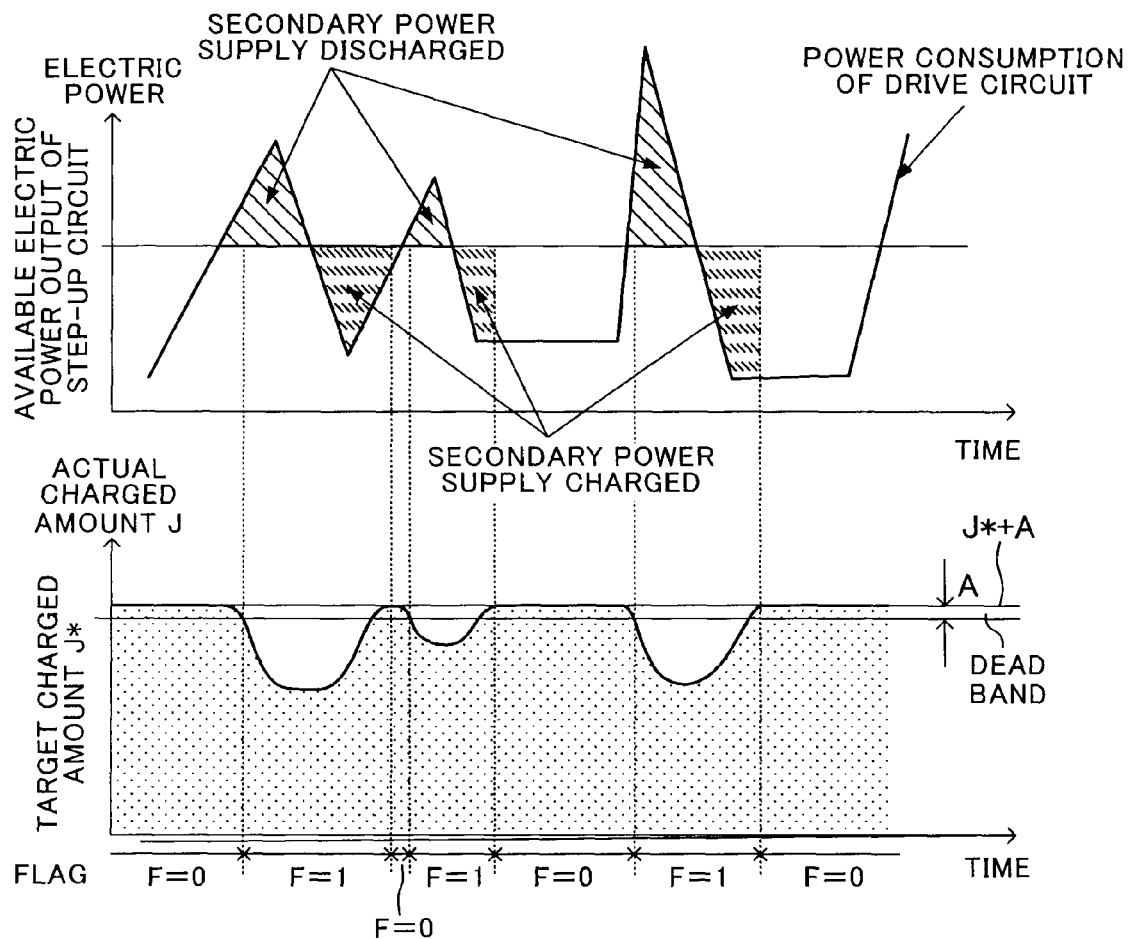
FIG. 7 is a pair of graphs showing change in power consumption and resultant changes in the charge/discharge state of a secondary power supply apparatus, the charged amount of the secondary power supply apparatus, and the set state of a flag F.

FIG. 7 is a pair of graphs showing change in the power consumption of the motor drive circuit 30 and resultant changes in the charge/discharge state of the secondary power supply apparatus 50, the charged amount of the secondary power supply apparatus 50, and the set state of the flag F, when the charge/discharge control is performed.

Figure 6:
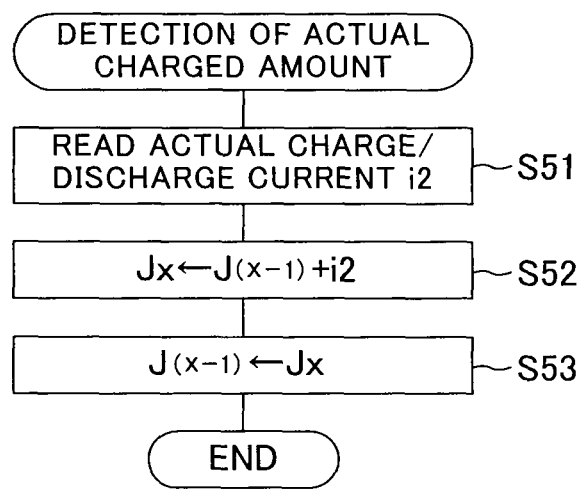
FIG. 6 is a flowchart showing an actual-charged amount detection routine.

Next, actual-charged amount detection processing will be described. FIG. 6 shows an actual-charged amount detection routine which is stored in the ROM of the electronic control apparatus 60 as a control program and executed by the power supply control section 62. The actual-charged amount detection routine is started when the ignition switch 106 is turned on, and is repeatedly executed at predetermined short intervals. The actual charged amount detected by this actual-charged amount detection routine is read in step S21 as the actual charged amount Jx.

When this detection routine is started, in step S51, the power supply control section 62 reads the actual charge/discharge current i2 detected by the secondary current sensor 51. Subsequently, in step S52, the power supply control section 62 obtains the actual charged amount Jx at the present point in time, through calculation as follows.

$$Jx = J_{(x-1)} + i2$$

Here, $J_{(x-1)}$ represents the previous actual charged amount. The previous actual charged amount refers to the actual charged amount Jx in the previous cycle of the present actual-charged amount detection routine, which is repeated at predetermined intervals.

In the present embodiment, when the ignition switch 106 is turned off, the electric charge charged in the secondary power supply apparatus 50 is discharged to the primary battery 101. Therefore, when the present detection routine is started, the actual charged amount Jx, which is the amount of electricity charged in the secondary power supply apparatus 50, is an approximately constant, low value. Therefore, a previously set fixed value (e.g., $J_{(x-1)}=0$) is used as an initial value of the previous actual charged amount $J_{(x-1)}$.

Subsequently, in step S53, the power supply control section 62 stores the actual charged amount Jx at the present point in time as the previous actual charged amount $J_{(x-1)}$, and ends the current execution of the present detection routine. The present detection routine is repeatedly executed at predetermined short intervals. Accordingly, at the time of next execution of the present detection routine, a value obtained by through addition of the actual charge/discharge current i2 detected this time to the actual charged amount Jx calculated in step S52 in the previous cycle is used as the actual charged amount Jx.

During a period in which the ignition switch 106 is on, the power supply control section 62 repeats such processing, to thereby obtain the actual charged amount Jx as a cumulative value of the actual charge/discharge current i2. In a state where a charging current flows, the accumulation operation is performed such that the actual charged amount Jx of the secondary power supply apparatus 50 increases. In a state where a discharging current flows, the accumulation operation is performed such that the actual charged amount Jx of the secondary power supply apparatus 50 decreases. Accordingly, the amount of electricity held in the secondary power supply apparatus 50 can be detected properly. FIG. 8 is a pair of graphs showing change in charged electric power; i.e., electric power charged into the secondary power supply apparatus 50 and change in the charged amount. In graph (A) of FIG. 8, when the charged electric power is negative, this indicates discharged electric power.

Next, control for discharging the electric charge charged into the secondary power supply apparatus 50 will be described. In the case where a capacitor is used as the secondary power supply apparatus 50, the service life of the secondary power supply apparatus 50 can be extended by discharging the electric charge when the secondary power supply apparatus 50 is not used for a long period of time. Further, in the case where the charged amount Jx of the secondary power supply apparatus 50 is detected on the basis of the cumulative value of the actual charge/discharge current i2 as described above, estimation of the initial value of the charged amount at the time of startup of the vehicle is difficult. In view of this, in the present embodiment, when the ignition switch 106 is turned off, the electric charge charged into the secondary power supply apparatus 50 is discharged to the primary battery 101 via the step-up circuit 40. Hereinbelow, control processing for discharging the electric charge will be described with reference to FIG. 9.

Figure 9:
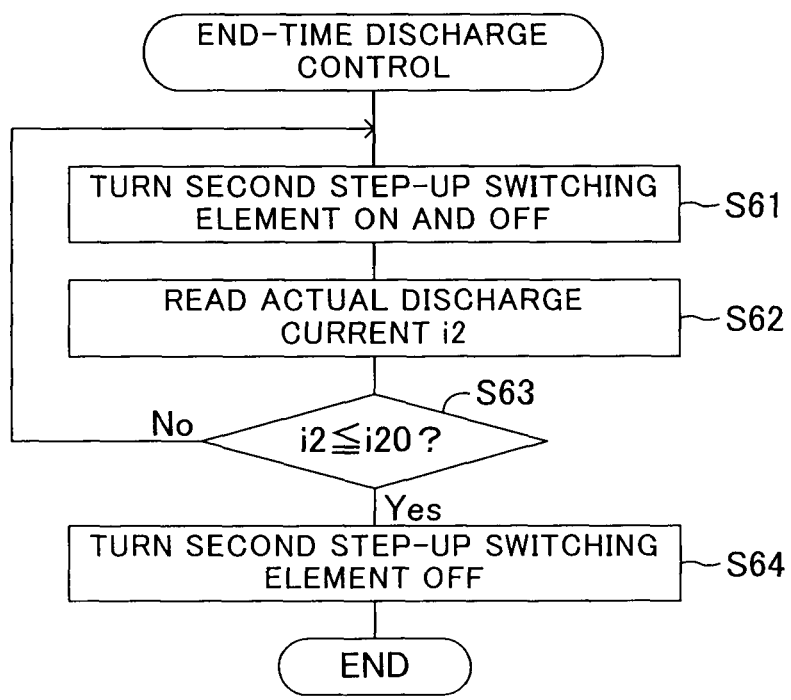
FIG. 9 is a flowchart showing an end-time discharge control routine.

FIG. 9 is a flowchart showing an end-time discharge control routine which is stored in the ROM of the electronic control apparatus 60 as a control program and executed by the power supply control section 62. The end-time discharge control routine is started when the ignition switch 106 is turned off. When the present control routine is started, in step S61, the power supply control section 62 outputs a pulse signal of a predetermined period to the gate of the second step-up switching element 44 of the step-up circuit 40 so as to turn the second step-up switching element 44 on and off at a predetermined duty ratio. Since the steering assist control is not performed in the period in which the ignition witch 106 is off, the switching elements 31 to 36 of the motor drive circuit 30 are maintained in their off states. Accordingly, the electric charge of the secondary power supply apparatus 50 is discharged toward the primary battery 101. In this case, through proper setting of the duty ratio of the second step-up switching element 44, the magnitude of the discharge current flowing from the secondary power supply apparatus 50 to the primary battery 101 can be restricted. Notably, the first step-up switching element 43 is maintained in the off state.

Subsequently, in step S62, the power supply control section 62 reads the actual charge/discharge current i2 (current flowing in the discharge direction) measured by the secondary current sensor 51. In step S63, the power supply control section 62 determines whether or not the actual charge/discharge current i2 has decreased and become equal to or less than a discharge stoppage determination current i20. This discharge stoppage determination current i20 may be zero ampere.

Until the actual charge/discharge current i2 becomes equal to or less than the discharge stoppage determination current i20, such processing of steps S61 to S63 is repeated. During such a period of time, the discharge of electric charge from the secondary power supply apparatus 50 to the primary battery 101 is continued. When the actual charge/discharge current i2 becomes equal to or less than the discharge stoppage determination current i20 (e.g., when the discharge current stops), in step S64, the power supply control section 62 turns the second step-up switching element 44 off, and ends the end-time discharge control routine.

Accordingly, the end-time discharge control routine can extends the service life of the secondary power supply apparatus 50. Further, detection of the actual charged amount after the next time the ignition switch 106 is turned on can be performed accurately. That is, although the actual charged amount is detected through calculation; i.e., by means of cumulating the charge/discharge current flowing to or from the secondary power supply apparatus 50, estimation of the initial charged amount at the time of start is difficult. In view of this, the processing for detecting the actual charged amount is performed after the electric charge of the secondary power supply apparatus 50 is discharged, whereby a detection error stemming from variation in the initial charged amount can be suppressed. Further, since the magnitude of the discharge current flowing to the primary battery 101 can be controlled by making use of the step-up circuit 40, provision of a separate discharge circuit is not required, so that cost does not increase.

According to the electric power steering apparatus equipped with the power supply control apparatus of the present embodiment described above, the stepped-up voltage of the step-up circuit 40 is feedback-controlled on the basis of the deviation of the actual charge/discharge current i2 from the target charge/discharge current i2*. Therefore, the charge state of the secondary power supply apparatus 50 can be readily controlled. In addition, since the target charge/discharge current i2* is set on the basis of the relation of magnitude between the actual charged amount Jx and the target charged amount J* and the electric power supply capacity of the step-up circuit 40 in relation to the consumed electric power, the excessive charging or discharging of the secondary power supply apparatus 50 can be suppressed.

For example, since the target charge/discharge current i2* is set to zero (i2=0) when the charged amount of the secondary power supply apparatus 50 is determined to be sufficient (flag F=0), charging of electricity to the secondary power supply apparatus 50 is restricted, whereby overcharging is prevented. Thus, the service life of the secondary power supply apparatus 50 can be extended. Further, unless the power consumption of the motor drive circuit 30 exceeds the output capacity limit of the step-up circuit 40, supply of electric power from the secondary power supply apparatus 50 is stopped. Only when the power consumption of the motor drive circuit 30 exceeds the output capacity limit of the step-up circuit 40, electric power is supplied from the secondary power supply apparatus 50 in an amount corresponding to the shortage of electric power. Accordingly, use of electric power of the secondary power supply apparatus 50 is avoided to a possible extent, and the secondary power supply apparatus 50 is caused to stand by for a case where a large amount of electric power is consumed. Accordingly, steering assist control can be performed satisfactory. Moreover, when the motor drive circuit 30 does not require electric power, the step-up operation of the step-up circuit 40 can be stopped, whereby consumption of energy necessary for the step-up operation can be suppressed.

Meanwhile, when the actual charged amount Jx has not yet reached the target charged amount J* (flag F=1), if the output of the step-up circuit 40 has a margin in relation to the power consumption of the motor drive circuit 30, the target charge/discharge current i2* is set to a positive value, whereby electric power of the primary power supply apparatus 100 is charged to the secondary power supply apparatus 50 via the step-up circuit 40. In this case, since the target charge/discharge current i2* is set to perform the charging by making full use of the power supply capacity of the step-up circuit 40, while securing the electric power to be supplied to the motor drive circuit 30, the secondary power supply apparatus 50 can be charged quickly.

Even when the actual charged amount Jx has not yet reached the target charged amount J* (flag F=1), if the output of the step-up circuit 40 has no margin in relation to the power consumption of the motor drive circuit 30, the target charge/discharge current i2* is set to zero (i2*=0). Accordingly, charging of electricity to the secondary power supply apparatus 50 is restricted, and only an amount of electric power corresponding to the shortage of electric power to the motor drive circuit 30 is supplied from the secondary power supply apparatus 50 to the motor drive circuit 30. Accordingly, supply of electric power to the motor drive circuit 30 and suppression of consumption of electric power of the secondary power supply apparatus 50 can be realized simultaneously.

Since the target charged amount J* is set such that the target charged amount J* decreases as the vehicle speed increases, in a situation where consumption of a large amount of electric power is expected, the charged amount of the secondary power supply apparatus 50 increases, whereby its power supply supplementing capacity increases. In contrast, in a situation where consumption of a large amount of electric power is not expected, the charging is restricted, whereby the service life of the secondary power supply apparatus 50 can be extended.

Since a dead band is provided for comparison between the actual charged amount Jx (the amount of electricity actually charged into the secondary power supply apparatus 50) and the target charged amount J*, a hunting phenomenon in which charging and discharging of the secondary power supply apparatus 50 are repeated frequently can be prevented. Thus, the service life of the secondary power supply apparatus 50 can be extended further.

Both the primary power supply apparatus 100 and the secondary power supply apparatus 50 are used as apparatus for supplying electric power to the electric power steering apparatus so as to fully provide the steering assist performance. Therefore, an increase in the capacity of the primary power supply apparatus 100 can be suppressed. Further, the step-up circuit 40 enables efficient drive of the motor drive circuit 30. Moreover, since the charging and discharging of the secondary power supply apparatus 50 can be controlled by making use of the step-up circuit 40, the circuit configuration does not become complex, and an increase in cost can be suppressed. For example, a changeover circuit, switches, etc. for switching between charging and discharging become unnecessary.

Even when the stepped-up voltage of the step-up circuit 40 fluctuates due to control of charging/discharging of the secondary power supply apparatus 50, since the assist control section 61 performs PWM control for the motor drive circuit 30, the electric motor 20 can be properly driven and controlled.

Figure 10:
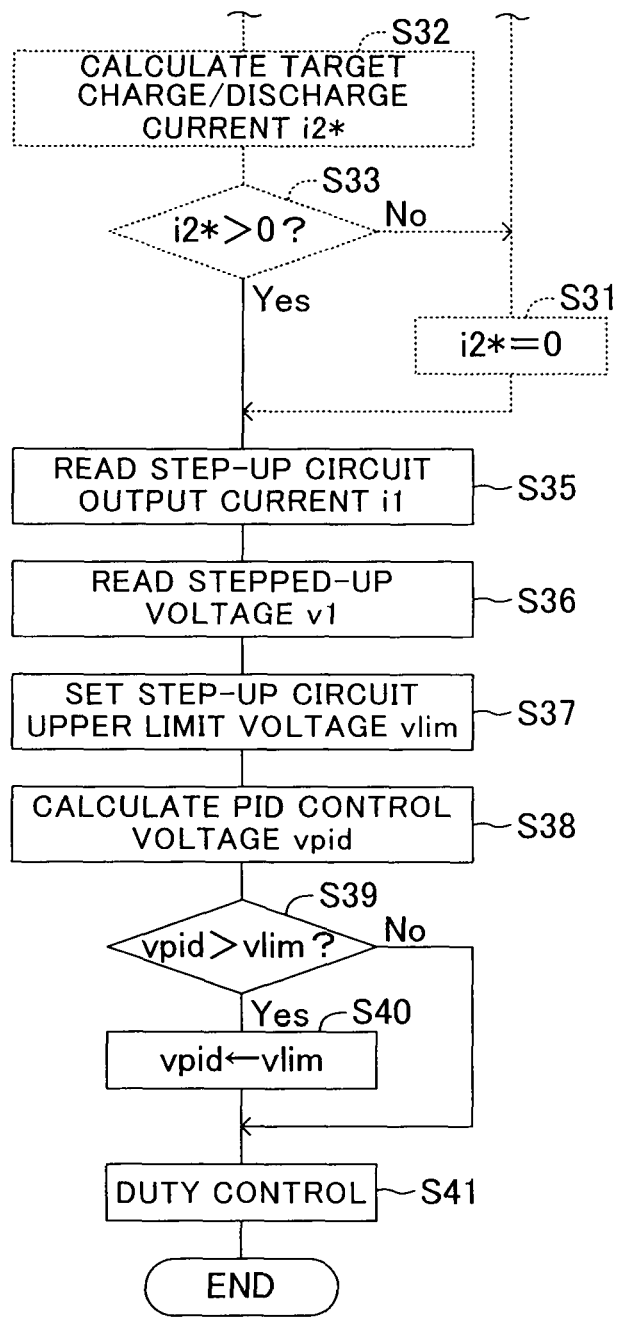
FIG. 10 is a flowchart showing a portion of a charge/discharge control routine according to a modification.

Next, a modification of the above-described embodiment will be described. In this modification, an upper limit is set for the stepped-up voltage of the step-up circuit 40. Specifically, in place of the processing of step S34 of the above-described charge/discharge control routine, the processing shown in FIG. 10 is executed. The remaining configuration is the same as that of the above-described embodiment.

In the case where the stepped-up voltage is controlled on the basis of the deviation of the actual charge/discharge current i2 from the target charge/discharge current i2*, due to an increase in the stepped-up voltage, the step-up circuit 40 may output an amount of electric power which exceeds the rated available electric power output. In such a case, the voltage-stepping-up efficiency of the step-up circuit 40 lowers. Further, the durability of the step-up circuit 40 may be deteriorated.

In view of these drawbacks, in the present modification, an upper limit is provided for the stepped-up voltage, and the step-up operation of the step-up circuit 40 is restricted such that the stepped-up voltage does not exceed the upper limit.

FIG. 10 is a flowchart representing a portion of the charge/discharge control routine, and shows processing which replaces the processing of step S34 shown in FIG. 4.

After setting the target charge/discharge current i2* in step S32 or step S31, the power supply control section 62 performs the processing of step S35. In step S35, the power supply control section 62 reads the step-up circuit output current i1 detected by the primary current sensor 46. Subsequently, the power supply control section 62 reads the stepped-up voltage v1 detected by the primary voltage sensor 47.

Figure 11:
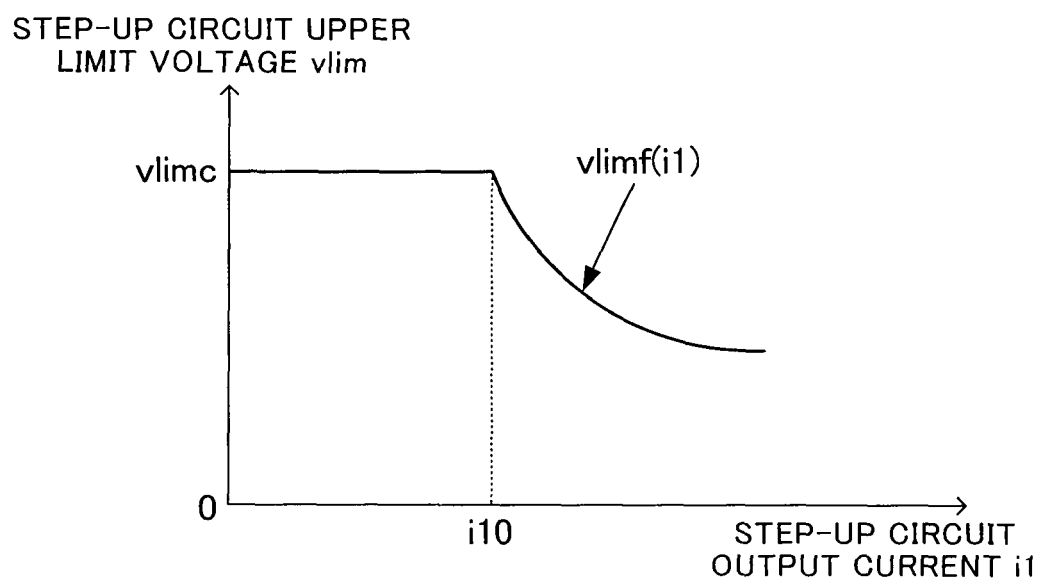
FIG. 11 is a graph showing a characteristic curve of step-up-circuit upper limit voltage according to the modification.

Subsequently, in step S37, the power supply control section 62 sets a step-up circuit upper limit voltage vlim. As shown in FIG. 11, when the step-up circuit output current i1 is equal to or less than a reference current i10, the step-up circuit upper limit voltage vlim is set to a constant voltage vlimc. When the step-up circuit output current i1 exceeds the reference current i10, the step-up circuit upper limit voltage vlim is set to an upper limit voltage vlimf(i1) which decreases inverse-proportionally to an increase in the step-up circuit output current i1. This upper limit voltage vlimf(i1) represents an equi-electric-power control line according to which the step-up circuit upper limit voltage is controlled, so that step-up circuit output electric power, which is the product of the step-up circuit output current i1 and the upper limit voltage vlimf(i1), becomes constant. Further, the step-up circuit upper limit electric power determined by the upper limit voltage vlimf(i1) is set to a value equal to or smaller than the rated available electric power output of the step-up circuit 40.

The relation between the step-up circuit output current i1 and the step-up circuit upper limit voltage vlim is stored in the ROM in the form of a reference table or a function. In step S37, the power supply control section 62 sets the step-up circuit upper limit voltage vlim while reading the data representing the relation.

Next, in step S38, the power supply control section 62 calculates a PID control voltage vpid. The PID control voltage vpid is a target stepped-up voltage calculated from the deviation of the actual charge/discharge current i2 from the target charge/discharge current i2* in accordance with a PID control equation. Subsequently, in step S39, the power supply control section 62 determines whether or not the PID control voltage vpid is greater than the step-up circuit upper limit voltage vlim. When the PID control voltage vpid is greater than the step-up circuit upper limit voltage vlim (S39: YES), in step S40, the power supply control section 62 changes the PID control voltage vpid to the step-up circuit upper limit voltage vlim. That is, the PID control voltage vpid calculated in accordance with the PID control equation is lowered to the step-up circuit upper limit voltage vlim. Meanwhile, when the PID control voltage vpid is less than the step-up circuit upper limit voltage vlim (S39: NO), the power supply control section 62 does not change the PID control voltage vpid.

Once the final PID control voltage vpid is set as described above, in step S41, the power supply control section 62 adjusts the duty ratios of the first and second step-up switching elements 43 and 44 of the step-up circuit 40 to thereby control the stepped-up voltage to the PID control voltage vpid. Current execution of the charge/discharge control routine according to this modification ends after the processing of step S41. After that, the processing starting from step S21 is repeated at predetermined intervals.

The charge/discharge control routine according to the modification described above restricts the output electric power of the step-up circuit 40 to the rated available electric power output of the step-up circuit 40 or less. Accordingly, it is possible to prevent a drop in voltage-stepping-up efficiency of the step-up circuit 40 and improve the durability thereof. Further, when the motor drive circuit 30 requires a large amount of electric power, supply of electric power from the secondary power supply apparatus 50 to the motor drive circuit 30 can be reliably started at a proper timing, because the step-up circuit upper limit voltage vlim decreases inverse-proportionally as the step-up circuit output current i1 increases.

In the above, an electric power steering apparatus equipped with a power supply control apparatus has been described as an embodiment of the present invention. However, the present invention is not limited to the above-described embodiment, and may be modified in various manners without departing from the scope of the present invention. For example, in the above-described embodiment, PID control is employed so as to feedback-control the stepped-up voltage on the basis of the current deviation (i2*−i2). However, there can be employed various types of feedback controls such as feedback control based on an equation which contains a proportional term only and feedback control based on an equation which contains a proportional term and an integral term.

Application of the power supply control apparatus is not limited to electric power steering apparatuses, and the power supply control apparatus can be applied to various apparatuses. For example, the power supply control apparatus can be applied to various apparatuses mounted on vehicles, such as electric-controlled brake apparatuses, electric-controlled suspension apparatuses, and electric-controlled stabilizer apparatuses. Further, the power supply control apparatus can be applied to other types of steering apparatuses which impart steering force to wheels, for example, a by-wire-type steering apparatus in which the steering wheel and steering shafts of wheels are mechanically separated from each other, and the wheels are steered only by a force produced by an electric motor which operates in accordance with a steering operation.

Notably, the configuration composed of the primary power supply apparatus 100, the step-up circuit 40, the power supply control section 62, the secondary power supply apparatus 50, the secondary current sensor 51, the primary current sensor 46, and the primary voltage sensor 47 corresponds to the power supply control apparatus according to the embodiment of the present invention.

The invention claimed is:

1. A power supply control apparatus for controlling a primary power supply apparatus; a step-up circuit which steps up an output voltage of the primary power supply apparatus and outputs the stepped up voltage to a drive circuit for an electric actuator; and a secondary power supply apparatus which is connected in parallel to a line between the step-up circuit and the drive circuit, into which electric power output from the step-up circuit is charged, and which supplements the supply of electric power to the drive circuit while using the charged electric power, the power supply control apparatus comprising:

charged amount detection means for detecting an amount of electricity charged into the secondary power supply apparatus; and charge/discharge control means for controlling charging and discharging of the secondary power supply apparatus by controlling the step-up circuit to adjust a magnitude of the stepped-up voltage output therefrom on the basis of the detected charged amount and a target charged amount, wherein, when the detected charged amount is less than the target charged amount and a power consumption of the drive circuit is less than an available electric power output of the step-up circuit, the charge/discharge control means controls the step-up circuit to adjust the magnitude of the stepped-up voltage such that the stepped-up voltage becomes higher than a power supply voltage of the secondary power supply apparatus, and when the detected charged amount is less than the target charged amount and a power consumption of the drive circuit is equal to or greater than an available electric power output of the step-up circuit, the charge/discharge control means controls the step-up circuit to adjust the magnitude of the stepped-up voltage such that the stepped-up voltage becomes equal to the power supply voltage of the secondary power supply apparatus.

2. A power supply control apparatus according to claim 1, wherein, when the detected charged amount is equal to or greater than the target charged amount, the charge/discharge control means controls the step-up circuit to adjust the magnitude of the stepped-up voltage such that the stepped-up voltage becomes equal to a power supply voltage of the secondary power supply apparatus when electric power is supplied to the drive circuit.

3. A power supply control apparatus according to claim 1, wherein the charge/discharge control means includes:

target-charge/discharge-current setting means for setting a target charge/discharge current of the secondary power supply apparatus on the basis of the charged amount detected by the charged amount detection means and the target charged amount;

current detection means for detecting a charge/discharge current flowing to or from the secondary power supply apparatus; and feedback control means for feedback-controlling the step-up circuit to adjust the magnitude of the stepped-up voltage output therefrom on the basis of a difference between the target charge/discharge current set by the target-charge/discharge-current setting means and the charge/discharge current detected by the current detection means.

4. A power supply control apparatus according to claim 3, wherein, when the charged amount detected by the charged amount detection means is less than the target charged amount, the target-charge/discharge-current setting means sets a target charge current on the basis of the available electric power output of the step-up circuit and the power consumption of the drive circuit.

5. A power supply control apparatus according to claim 4, wherein, when the charged amount detected by the charged amount detection means is less than the target charged amount and the power consumption of the drive circuit becomes equal to or greater than the available electric power output of the step-up circuit, the target-charge/discharge-current setting means sets the target charge/discharge current to zero.

6. A power supply control apparatus according to claim 3, wherein, when the charged amount detected by the charged amount detection means is equal to or greater than the target charged amount, the target-charge/discharge-current setting means sets the target charge/discharge current to zero.

7. A power supply control apparatus according to claim 3, wherein the charged amount detection means detects the charged amount of the secondary power supply apparatus on the basis of a cumulative value of the charge/discharge current flowing to or from the secondary power supply apparatus.

8. A power supply control apparatus according to claim 1, wherein a first target value is used as the target charged amount when the charged amount is determined to be less than the target charged amount, and a second target value greater than the first target value is used as the target charged amount when the charged amount is determined to be equal to or greater than the target charged amount.

9. A power supply control apparatus according to claim 1, further comprising:

stepped-up-voltage detection means for detecting the stepped-up voltage of the step-up circuit;

step-up-current detection means for detecting an output current of the step-up circuit; and upper-limit-voltage setting means for setting an upper limit of the stepped-up voltage output by the step-up circuit under control of the charge/discharge control means in accordance with the detected output current, such that the output electric power of the step-up circuit does not exceed an available electric power output of the step-up circuit.

10. A power supply control apparatus according to claim 9, wherein the upper-limit-voltage setting means sets a fixed upper limit voltage when the detected output current is equal to or less than a reference current, and sets an upper limit voltage which decreases with an increase in the detected output current when the output current exceeds the reference current.

11. A power supply control apparatus according to claim 1, wherein the power supply control apparatus is used for a steering apparatus of a vehicle which imparts a steering force to wheels by operating the electric actuator.

12. A power supply control apparatus according to claim 11, wherein the electric actuator is an electric motor; and the drive circuit is a bridge circuit for driving the electric motor while adjusting the voltage of the supplied electric power through duty control of switching elements.

13. A power supply control apparatus according to claim 11, further comprising:

vehicle-speed-information obtaining means for obtaining vehicle speed information; and target-charged-amount setting means for setting the target charged amount on the basis of the obtained vehicle speed information.

14. A power supply control apparatus according to claim 11, wherein the charged amount detection means includes:

charge/discharge current cumulating means for obtaining a cumulative value of a charge/discharge current flowing to or from the secondary power supply apparatus during a period in which an ignition switch of the vehicle is on; and end-time discharge means, operable when the ignition switch is turned off, for discharging an electric charge of the secondary power supply apparatus to the primary power supply apparatus.

15. A power supply control apparatus for controlling a primary power supply apparatus; a step-up circuit which steps up an output voltage of the primary power supply apparatus and outputs the stepped up voltage to a drive circuit for an electric actuator; and a secondary power supply apparatus which is connected in parallel to a line between the step-up circuit and the drive circuit, into which electric power output from the step-up circuit is charged, and which supplements the supply of electric power to the drive circuit while using the charged electric power, the power supply control apparatus comprising:

a detector that detects an amount of electricity charged into the secondary power supply apparatus; and a controller that controls charging and discharging of the secondary power supply apparatus by causing the step-up circuit to change a magnitude of the stepped-up voltage output therefrom on the basis of the detected charged amount and a target charged amount, wherein, when the detected charged amount is less than the target charged amount and a power consumption of the drive circuit is less than an available electric power output of the step-up circuit, the controller controls the step-up circuit to adjust the magnitude of the stepped-up voltage such that the stepped-up voltage becomes higher than a power supply voltage of the secondary power supply apparatus, and when the detected charged amount is less than the target charged amount and a power consumption of the drive circuit is equal to or greater than an available electric power output of the step-up circuit, the controller controls the step-up circuit to adjust the magnitude of the stepped-up voltage such that the stepped-up voltage becomes equal to the power supply voltage of the secondary power supply apparatus.

16. A power supply control system, comprising:

a primary power supply apparatus;

a step-up circuit which steps up an output voltage of the primary power supply apparatus and outputs the stepped up voltage to a drive circuit for an electric actuator;

a secondary power supply apparatus which is connected in parallel to a line between the step-up circuit and the drive circuit, into which electric power output from the step-up circuit is charged, and which supplements the supply of electric power to the drive circuit while using the charged electric power; and a power supply control apparatus including, a detector that detects an amount of electricity charged into the secondary power supply apparatus; and a controller that controls charging and discharging of the secondary power supply apparatus by causing the step-up circuit to change a magnitude of the stepped-up voltage output therefrom on the basis of the detected charged amount and a target charged amount, wherein, when the detected charged amount is less than the target charged amount and a power consumption of the drive circuit is less than an available electric power output of the step-up circuit, the controller controls the step-up circuit to adjust the magnitude of the stepped-up voltage such that the stepped-up voltage becomes higher than a power supply voltage of the secondary power supply apparatus, and when the detected charged amount is less than the target charged amount and a power consumption of the drive circuit is equal to or greater than an available electric power output of the step-up circuit, the controller controls the step-up circuit to adjust the magnitude of the stepped-up voltage such that the stepped-up voltage becomes equal to the power supply voltage of the secondary power supply apparatus.

17. The power control apparatus according to claim 1, wherein the step-up circuit includes two switching elements configured to control the magnitude of the stepped-up voltage, and the charge/discharge means controls charging and discharging of the secondary power supply apparatus by varying a switching duty cycle of the switching elements of the step-up circuit to cause the step up circuit to adjust the magnitude of the stepped-up voltage.

* * * * *